US006473746B1

United States Patent
Zakrzewski (12)

(10) Patent No.: US 6,473,746 B1
(45) Date of Patent: Oct. 29, 2002

(54) METHOD OF VERIFYING PRETRAINED NEURAL NET MAPPING FOR USE IN SAFETY-CRITICAL SOFTWARE

(75) Inventor: Radoslaw Romuald Zakrzewski, South Burlington, VT (US)

(73) Assignee: Simmonds Precision Products, Inc., Charlotte, NC (US)

( * ) Notice: Subject to any disclaimer, the term of this patent is extended or adjusted under 35 U.S.C. 154(b) by 0 days.

(21) Appl. No.: 09/465,881

(22) Filed: Dec. 16, 1999

(51) Int. Cl.[7] ............................................. G06F 15/18
(52) U.S. Cl. ........................................ 706/15; 706/31
(58) Field of Search ...................... 706/15, 31

(56) References Cited

PUBLICATIONS

Asada et al, "Transfer of Human Skills to Neural Net. Robot Controllers", IEEE Proceedings on International Conference on Robotics and Automation, Apr. 1991.*

Miyamura et al, "Restricted Learning Algorithm and its Application to Neural Network Training", IEEE Workshop on Neural Network for Signal Processing, Oct. 1991.*

* cited by examiner

Primary Examiner—George B. Davis
(74) Attorney, Agent, or Firm—James M. Rashid; Calfee, Halter & Griswold LLP

(57) ABSTRACT

A method of verifying pretrained, static, feedforward neural network mapping software using Lipschitz constants for determining bounds on output values and estimation errors is disclosed. By way of example, two cases of interest from the point of view of safety-critical software, like aircraft fuel gauging systems, are discussed. The first case is the simpler case of when neural net mapping software is trained to replace look-up table mapping software. A detailed verification procedure is provided to establish functional equivalence of the neural net and look-up table mapping functions on the entire range of inputs accepted by the look-up table mapping function. The second case is when a neural net is trained to estimate the quantity of interest form the process (such as fuel mass, for example) from redundant and noisy sensor signals. Given upper and lower bounds on sensor noises and on modeling inaccuracies, it is demonstrated how to verify the performance of such a neural network estimator (a "black box") when compared to a true value of the estimated quantity.

31 Claims, 9 Drawing Sheets

METHOD OF VERIFYING PRETRAINED NEURAL NET MAPPING FOR USE IN SAFETY-CRITICAL SOFTWARE

BACKGROUND OF THE INVENTION

The present invention is directed to a method of verifying neural network mapping software, in general, and more particularly, to a method of verifying pretrained, static, feedforward neural network mapping software using Lipschitz constants for determining bounds on output values and estimation errors.

Certification of flight software containing neural network mapping functions generally encounters significant difficulties. Neural net mapping software has the reputation for probabilistic and unpredictable behavior. Such perception seems to be mainly a result of lack of understanding of the true nature of feedforward neural nets, in particular the distinction between the training process (which indeed can be unpredictable) and operation of a previously trained neural net (which is always deterministic).

What is needed is a finite testing procedure for verifying the behavior of pretrained neural net mapping software. Applicant has realized that the issue of how to train a neural net does not have to be addressed when analyzing the performance of the trained neural net software, rather it can be analyzed irrespective of the particular way it was trained. Applicant has discovered that pretrained neural net mapping software can be fully verified without any need to address the preceding training process. Static, feedforward neural nets represent purely deterministic mappings for which the output value can be fully predicted based on current instantaneous input values. While use of dynamic (recurrent) neural networks might understandably cause concerns about stability issues, static neural nets do not pose any such problems. Static neural network mapping software is merely a method of implementing multidimensional functions, just as look-up table mapping software is. Consequently, certification of a previously trained neural net should not be any more difficult than certification of any other mapping software, such as a look-up table. In this document, Applicant will focus on this analogy, and demonstrate mathematically that if a look-up table software implementation of a mapping is certifiable, so should be a neural net software implementation.

Therefore, Applicant's focus here is to provide a verification method or testing procedure to guarantee proper behavior of static, feedforward neural network mapping software, especially for use under flight conditions.

SUMMARY OF THE INVENTION

In accordance with the present invention, a method of verifying pretrained, static, feedforward neural network mapping software having a neural net mapping function $f(x)$ that is intended to replace look up table mapping software having a look up table mapping function $\phi(x)$ comprises the steps of: (1) establishing a multi-axis rectangular domain including upper and lower limits of each axis to bound all input vectors x of both said look up table mapping function $\phi(x)$ and said neural net mapping function $f(x)$; (2)

determining a set of test points within the rectangular domain based on said upper and lower limits of each axis; (3) determining Lipschitz constant $K_f$ for said neural net mapping function $f(x)$; and (4) determining upper and lower value bounds of said neural net mapping function $f(x)$ for said domain based on a function of said set of test points and said Lipschitz constant $K_f$, whereby if said upper and lower value bounds can be determined, then the neural network mapping software is verified.

In another aspect of the present invention, the foregoing described method includes the additional steps of: determining Lipschitz constant $K_f'$ for the gradient $f(x)'$; and determining upper and lower error bounds for the neural net and look up table functions based on a function of the set of test points and said Lipschitz constant $K_f'$, whereby if the upper and lower value bounds and said upper and lower error bounds can be determined, then the neural network mapping software is verified.

In yet another aspect of the present invention, a method of verifying pretrained, static, feedforward neural network mapping software having a neural network mapping function $f(\psi(x)+\zeta)$, where $\psi(x)$ is a predetermined mapping of n dimensional state vectors x of a process into m dimensional measurement vectors $z=\psi(x)$, $\zeta$ is representative of a noise component of the process, and $f(\psi(x)+\zeta)$ is an estimate of the desired output parameter y(est) of the process, comprises the steps of: (1) providing model mapping software including a predetermined mapping function $\phi(x)$ for mapping said n dimensional state vectors x directly into a true value y(true) of said desired output parameter; (2) establishing a multi-axis rectangular domain including upper and lower limits of each axis to bound all state vectors x of both said predetermined mapping functions $\phi(x)$ and $\psi(x)$; (3) determining a set of test points within the rectangular domain based on said upper and lower limits of each axis; (4) determining Lipschitz constant $K_f$ for neural net mapping function $f(\psi(x))$; (5) determining an upper bound $\zeta^{up}$ and a lower bound $\zeta^{lo}$ of the noise component $\zeta$; and (6) determining upper and lower value bounds of said neural net mapping function $f(\psi(x)+\zeta)$ for said domain based on a function of said set of test points, said Lipschitz constant $K_f$ and said upper bound $\zeta^{up}$ and lower bound $\zeta^{lo}$, whereby if said upper and lower value bounds can be determined, then the neural network mapping software is verified.

In still another aspect of the present invention, the foregoing described method includes the additional steps of: (7) determining Lipschitz constant $K_f'$ for the gradient $f(\psi(x))'$; and determining upper and lower error bounds for said neural net function $f(\psi(x)+\zeta)$ and predetermined mapping function $\phi(x)$ based on a function of said set of test points, said Lipschitz constant $K_f'$, and said upper bound $\zeta^{up}$ and a lower bound $\zeta^{lo}$, whereby if the upper and lower value bounds and said upper and lower error bounds can be determined, then the neural network mapping software is verified.

DESCRIPTION OF THE PREFERRED EMBODIMENT

By way of example, two cases of interest from the point of view of flight software, like fuel gauging systems, for example, will be analyzed. The first case is the simpler case of when neural net mapping software is trained to replace look-up table mapping software. A detailed testing procedure is provided to establish functional equivalence of the neural net and look-up table mapping functions on the entire range of inputs accepted by the look-up table mapping function.

The second case is when a neural net is trained to estimate the quantity of interest form the process (such as fuel mass, for example) from redundant and noisy sensor signals. Given upper and lower bounds on sensor noises and on modeling inaccuracies, it is demonstrated how to assess the performance of such a neural network estimator (a "black box") when compared to a true value of the estimated quantity.

Feedforward Neural Nets

Figure 1:
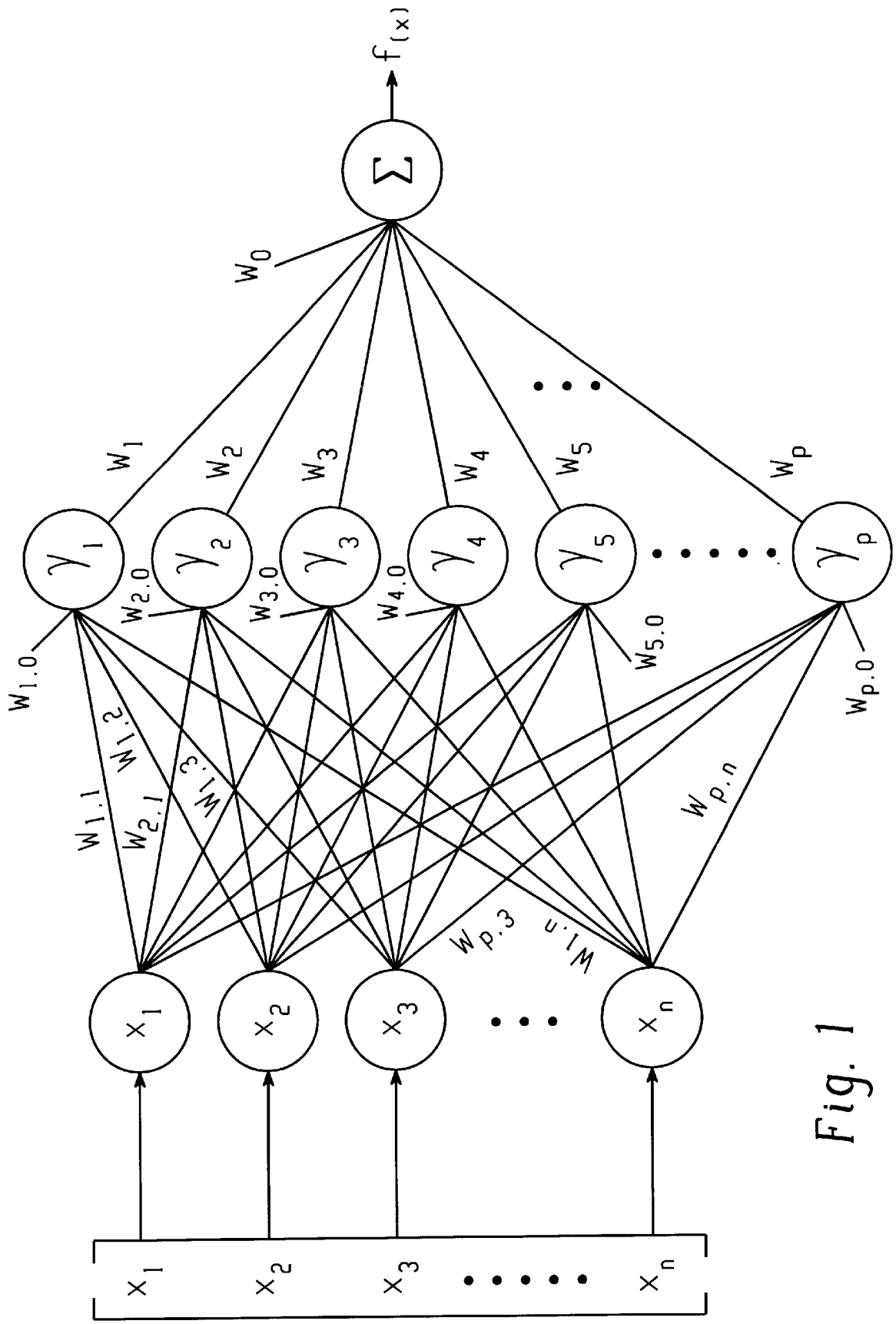
FIG. 1 is an illustration of an exemplary multiple-input, single-output neural network mapping function suitable for use in describing the principles of the present invention.

By way of example, only mapping software of neural networks with multiple-input single-output neural nets such as that shown in FIG. 1 will be described. Extension to multiple-output nets is conceptually very simple—each coordinate mapping may be treated as a separate single-output function. However, inclusion of such cases here would unnecessarily complicate notation. Thus, for purposes of describing the exemplary neural network of FIG. 1, let us assume a neural net mapping software having a neural net function with n-dimensional real argument, and one-dimensional real output value:

$$f: \Re^n \to \Re$$

with a single hidden layer containing p hidden neurons. Its output is calculated as $$f(x) = w_0^{(o)} + \sum_{i=1}^{p} w_i^{(o)} \gamma \left( w_{i,0}^{(h)} + \sum_{j=1}^{n} w_{i,j}^{(h)} x_j \right)$$

where $w_{i,j}^{(h)}$ are hidden layer weights corresponding to i-th neuron and j-th input, $w_{i,0}^{(h)}$ are hidden layer bias terms corresponding to i-th neuron, $w_i^{(o)}$ are output weights corresponding to i-th hidden neuron, and $w_0^{(o)}$ is the output bias term. The hidden layer activation function $\gamma$ is a one-dimensional function $$\gamma: \Re \to \Re$$

Two most common examples of an activation function are the logistic function $$y(x) = \frac{1}{1 + e^{-x}}$$

and the hyperbolic tangent $$\gamma(x) = \frac{e^x - e^{-x}}{e^x + e^{-x}}$$

Two weight matrices may be defined as:

$$W^{(h)} = \begin{bmatrix} w_{1,1}^{(h)} & \cdots & w_{1,n}^{(h)} \\ \vdots & \ddots & \vdots \\ w_{p,1}^{(h)} & \cdots & w_{p,n}^{(h)} \end{bmatrix} \quad W^{(o)} = [w_1^{(o)} \ \cdots \ w_p^{(o)}],$$

with two bias vectors $$b^{(h)} = \begin{bmatrix} w_{1,0}^{(h)} \\ \vdots \\ w_{p,0}^{(h)} \end{bmatrix} \quad b^{(o)} = [w_0^{(o)}]$$

and a diagonal nonlinear mapping $\Gamma: \Re^p \to \Re^p$, whose coordinate functions are defined as $$\eta = \Gamma(\xi): \eta_j = \gamma(\xi_i)$$

This neural network mapping function may be expressed in a matrix form as:

$$f(x) = W^{(o)} \Gamma(W^{(h)} x + b^{(h)}) + b^{(o)}$$

The above definition can be extended to multiple layers—one has to define a weight matrix and a bias vector for each layer. However, to avoid notational clutter, and because one hidden layer is usually enough, we constrain ourselves to the one-layer case. If more hidden layers are deemed necessary, all the arguments in this application can be very easily modified to handle such cases.

Upon inspection of the above formulae, it is seen that a feedforward neural net mapping function is a superposition of simple matrix operations and a particularly simple diagonal nonlinear operation $\Gamma$ (which can be thought of as a soft-limiter). Thus, certification of mapping software including a neural net function should be no more difficult than certification of other types of mapping software having elementary mathematical functions.

Arriving at appropriate weight matrices $W^{(h)}$, $W^{(o)}$ and bias vectors $b^{(h)}$, $b^{(o)}$ of the neural network is accomplished through the process customarily called "training" that usually involves a number of training points—different values of input vector $x^{(i)}$—for which a desired, or correct output value $y^{(i)}$ is known. Training a neural net is equivalent to minimization of mean square error between the desired and actual output of a neural net with respect to the unknown weight values $$J = \sum_{i=1}^{N_t} ((f(x^{(i)}) - y^{(i)}))^2 \to \min$$

We minimization process is typically done using gradient of the error function with respect to unknown weight and bias values (which we will jointly call "the weights"). Depending on the particular optimization algorithm used, its outcome may be not deterministic, or may be difficult to predict. However, once the training is done and weights are fixed, the input-output behavior of the net becomes fully deterministic.

It should be mentioned here that some applications of neural networks involve on-line training, or adaptation. In such cases, the weights are continually changed during the actual operation of the neural network mapping software. Hence, if the same input vector is fed to the neural net twice, it may result in different output values. Because current operation of an adaptive neural network depends on its past inputs, it may be considered unpredictable, and danger of instability does exists. However, on-line training is not contemplated for the present embodiment. Instead, training of the neural network and its actual mapping software operation are fully separated: training of the software occurs off-line, and software operation occurs on-line. The actual input-output properties of the neural network mapping function are fully determined by the weight matrices. Accordingly, the construction of a verification procedure that will guarantee full knowledge of the behavior of the trained neural network is based on the assumption that training and testing points can be generated at will by a computer simulation model. If this is true, the input-output behavior of the neural network mapping software may be analyzed without any reference whatsoever to its training process.

In the preferred embodiment, a method of verifying pretrained neural network mapping software evaluates the output of the neural network mapping function thereof over a large set of uniformly spaced test points and to find upper and lower bounds on the values that can possibly be attained between those test points. To this end, Lipschitz constants $K_f$ and $K'_f$, are determined for the neural network mapping finction $f$ and for its gradient $f'$, respectively, such that for any two input vectors v, z the growth of $f$ and $f'$ can be expressed in terms of distance between v and z $$\|f(v)-f(z)\| \leq K_f \|v-z\|$$

$$\|f'(v)^T - f'(z)^T\| \leq K'_f \|v-z\|.$$

Such constants can easily be calculated in terms of weight matrices as shown in Appendix A.1 wherein two sets of formulae for such Lipschitz constants are derived with the expressions:

$$K_f = \gamma'_{max} \sum_{k=1}^{p} |w_k^{(o)}| \sqrt{\sum_{i=1}^{n} (w_{k,i}^{(h)})^2}$$

$$K'_f = \gamma''_{max} \sqrt{\sum_{k=1}^{n} \left( \sum_{j=1}^{p} |w_j^{(o)}||w_{j,k}^{(h)}| \sqrt{\sum_{i=1}^{n} (w_{j,i}^{(h)})^2} \right)^2}$$

or, alternatively:

$$K_f = \gamma'_{max} \sqrt{\sum_{i=1}^{p} (w_i^{(o)})^2} \sqrt{\max_i \lambda_i (W^{(h)T} W^{(h)})}$$

$$K'_f = \gamma''_{max} \sqrt{\sum_{i=1}^{p} (w_i^{(o)})^2 \max_i \lambda_i (W^{(h)T} W^{(h)})}$$

where $\gamma'_{max}$ are $\gamma''_{max}$ are constants dependent on the neuron activation function $\gamma(x)$, and $\lambda_i$ stands for i-th eigenvalue of a matrix. Applicability of the second set of formulae depends on availability and certifiability of matrix eigenvalue calculation. If this is inadmissible, more conservative expressions for the Lipschitz constants are:

$$K_f = \gamma'_{max} \sqrt{\sum_{i=1}^{p} (w_i^{(o)})^2} \sqrt{\sum_{i=1}^{p} \sum_{j=1}^{n} (w_{i,j}^{(h)})^2}$$

$$K'_f = \gamma''_{max} \sqrt{\sum_{i=1}^{p} (w_i^{(o)})^2} \sum_{i=1}^{p} \sum_{j=1}^{n} (w_{i,j}^{(h)})^2$$

Any of the above expressions can be used in the error-bounding procedures to be described later. From the efficiency standpoint it is desired to use the lowest possible values of $K_f$ and $K'_f$.

One application of a neural net mapping function is to replace a nonlinear mapping function given by a look-up table, for example. Look-up table mapping software has traditionally been used to express geometric relationships in processes, like fuel systems, for example. With larger number of input variables, practical implementation of a look-up table becomes cumbersome. A feedforward neural net is an ideal compact replacement for a large look-up table. Below differences and similarities between the two approaches to nonlinear mapping function approximation are considered.

By way of example, a look-up table, which is used to map an n-dimensional rectangle $R=(x^{(lo)}, x^{(up)})$ into the space of real numbers is considered. Assume that each of the coordinate intervals is partitioned into $N_i-1$, $N_i>2$ intervals, with the corresponding discretization step $$\Delta_i = \frac{x_j^{(up)} - x_i^{(lo)}}{N_i - 1}$$

The $N_i$ discretization points along the i-th axis are $$x_i^{(lo)}, x_i^{(lo)}+\Delta_i, \ldots, x_i^{(lo)}+k\Delta_i, \ldots, x_i^{(lo)}+(N_i-2)\Delta_i, x_i^{(up)}$$

Such a look-up table contains $N=N_1 N_2 \ldots N_n$ entries. The table entry $\Phi(k_1, k_2 \ldots, k_n)$, $0 \leq k_i < N_i$ contains the value of the tabulated function at a point $x(k_1, k_2, \ldots, k_n)$ $$x(k_1, k_2, \ldots, k_n) = \begin{bmatrix} x_1^{(lo)} + k_1 \Delta_1 \\ x_2^{(lo)} + k_2 \Delta_2 \\ \vdots \\ x_n^{(lo)} + k_n \Delta_n \end{bmatrix}$$

The value of the function at an arbitrary point within the rectangle is found via interpolation. Denote that point $x \in R$ (which satisfies $x_i^{(lo)} \leq x_i \leq x_i^{(up)}$ for all $1 \leq i \leq n$). Integers $k_1, k_2, \ldots, k_n$ are determined by the expression:

$$k_i = \text{floor}\left(\frac{x_i - x_i^{(lo)}}{\Delta_i}\right)$$

These indices define a rectangular cell containing x, which satisfies $$x_i^{(lo)}+k_i\Delta_i \leq x_i \leq x_i^{(lo)}+(k_i+1)\Delta_i$$

Using the two-dimensional analogy, the cell containing x has lower-left vertex characterized by indices $k_1, k_2 \ldots, k_n$. Now distances between the point x and the walls of the cell may be defined as:

$$\delta_i^0 = x_i - (x_i^{(lo)}+k_i\Delta_i)$$

$$\delta_i^1 = (x_i^{(lo)}+(k_i+1)\Delta_i) - x_i$$

Next, the corresponding $2^n$ table entries $\Phi(k_1+j_1, k_2+j_2, \ldots, k_n+j_n)$, $j_i=0,1$ are retrieved. Then the value of the function is calculated through multi-linear interpolation $$\varphi(x) = \frac{1}{\prod_{i=1}^{n} \Delta_i} \sum_{j_1=0}^{1} \sum_{j_2=0}^{1} \cdots \sum_{j_n=0}^{1} \Phi(k_1+j_1, \ldots, k_n+j_n) \prod_{i=1}^{n} \delta_i^{j_i}$$

In this application, upper case $\Phi$, indexed by integers, is used to denote values and gradients of the look-up table at discretization points (table entries). Lower case $\phi$, with a real argument, is used to denote values and gradients of the interpolated mapping evaluated at arbitrary points within its domain.

By comparison, both the look-up table approach and a feedforward neural network involve relatively simple calculations based on stored parameters. In case of a neural network mapping, the parameters are matrices $W^{(h)}$, $W^{(o)}$, $b^{(h)}$, $b^{(o)}$ (total of $np+2p+1$ parameters). In the case of a look-up table, the parameters are limit vectors $x^{(lo)}$, $x^{(up)}$, discretization steps $\Delta_i$ and table entries $\Phi(k_1, k_2, \ldots, k_n)$, $0 \leq k_i < N_i$ (total of $$3n + \prod_{i=1}^{n} N_i$$

parameters).

Putting aside the issues of software storage requirements and computational efficiency (both favorable for the neural net software implementation), there is only one substantial difference between a look-up table and a neural net. The weighted sum formula used for a look-up table calculations assures that the interpolated value does not exceed the minimal and maximal vertex values for a given cell $$\min_{j_1,\ldots,j_n=0,1} \Phi(k_1+j_1, \ldots, k_n+j_n) \leq$$

$$\varphi(x) \leq \max_{j_1,\ldots,j_n=0,1} \Phi(k_1+j_1, \ldots, k_n+j_n)$$

In addition, within each cell the interpolated function is monotonically increasing (or decreasing) along any straight line. Thus, the bounds for values of the look up table mapping function $\Phi(x)$ can be obtained directly through inspection of the stored values (parameters) $\Phi(k_1, k_2, \ldots, k_n)$.

Accordingly, the only true difference between the mapping software of neural nets and look-up tables from the point of view of a certification process is that bounds for values of the neural net mapping function $f(x)$ may not be immediately derived directly from the stored parameters $W^{(h)}$, $W^{(o)}$, $b^{(h)}$, $b^{(o)}$. Therefore, in what follows, how to derive guaranteed bounds on output values and on accuracy of a neural net mapping function by constructing an appropriate set of testing points will be addressed. If these bounds can be determined, certification of a pre-trained neural net will be equivalent to certification of a look-up table, which is a well-understood problem.

Verification of a Neural Net—Case of Look-Up Table Approximation

In this section, verification of input-output properties of a neural net mapping function $f(x)$, which has been trained to replace a look-up table mapping $\phi(x)$ will be addressed. Let $x$ denote an n-dimensional input vector, referred to as the state, and let $y=\phi(x)$ be the output of the function. In one embodiment of mapping software for flight application, the input vector $x$ may consist of three fuel plane coefficients, and $y$ may be the fuel quantity of at least one fuel tank on an aircraft. The goal is to verify that the trained neural network mapping function indeed approximates the given look-up table in software operation. A procedure to achieve this is outlined herebelow.

Specific technical assumptions are made to ensure the goal is well defined. Fist, the domain of both mappings is restricted to an n-dimensional rectangle $R=(x^{(lo)}, x^{(up)})$. That is, for each coordinate $xi$ we assume there are lower and upper bounds for the admissible values $$x_i^{(lo)} \leq x_i \leq x_i^{(up)}$$

It is assumed that during validation of the approximating mapping function $f$ there is unrestricted access to values of the approximated mapping $\phi$, that is for any $x \in R$ we can freely calculate $\phi(x)$. It is further assumed that implementation of $\phi$ is validated (certified) and values $\phi(x)$ are trusted to be true.

For inputs outside the domain of the lookup table, $x \notin R$, an appropriate "snap-to" method is implemented for the look-up table mapping function. That is, the reported value $\phi(x)$ of the tabulated function corresponds to some $\tilde{x} \in R$ that is close to $x$. Any sensible software implementation of a look-up table mapping function will include such a "snap-to" procedure. Then, the same method of clipping the input values will be used for the neural net software implementation. Alternatively, the software which uses the look-up table mapping $\phi$ may be implemented in such a manner that input values never lie outside the rectangle $R$. Then, the same assumption may be made for the neural network mapping function $f$. In any case, the behavior of mapping $f$ will be limited to input vectors such that $x \in R$.

Now, the following two questions which are relevant to the problem of validating behavior of neural network mapping $f$ on the rectangle $R$ will be addressed.

Boundedness of output value: Can values $M_{lo}$, $M_{up}$ which bound outputs of $f$, that is satisfy, for any $X \in R$, $M_{lo} \leq f(x) \leq M_{up}$ be determined?

Accuracy of approximation: Can values $M_{lo}^{error}, M_{up}^{error}$ such that for any $x \in R$ we have $M_{lo}^{error} \leq f(x) - \phi(x) \leq M_{up}^{error}$ be determined?

Finding an answer to the first question above guarantees that the value produced by the neural network mapping function is always bounded by $M_{lo}$, $M_{up}$. Knowledge of these constants may be important for analysis and verification of other segments of the software implementation, which may use $f(x)$ as input. For networks with sigmoidal activation function $\gamma$ output of each neuron is bounded, so the output of the whole neural network is also bounded. For example, if hyperbolic tangent is used as activation function, bounds for value of $f(x)$ can be easily found as $$M_{lo} = -\sqrt{\sum_{l=1}^{p} (w_l^{(o)})^2}$$

$$M_{up} = \sqrt{\sum_{l=1}^{p} (w_l^{(o)})^2}$$

These value bounds will hold for any conceivable input $x$, not just for the rectangle $R$. However, they may be too conservative, and may exceed the true desired range of the mapping function for inputs in $R$. Therefore, tighter bounds, based on actual values attained by the neural network mapping on a set of test points from R may be determined.

The answer to the second question assesses the goodness of the neural network software implementation replacement of the nonlinear look up table mapping. If it can be verified that the neural net mapping function approximates the look-up table within some sufficiently small neighborhood of zero ($M_{lo}^{error}, M_{up}^{error}$), then the neural net can be judged equivalent to the look-up table, and certifiability of the two should also be equivalent.

For particular software implementations it may be desirable to verify value bounds or accuracy bounds on some sub-rectangles of the form $\tilde{R}=(\tilde{x}^{(lo)}, \tilde{x}^{(up)})$, which are subsets of R (that is satisfy $x_i^{(lo)} \leq \tilde{x}_i^{(lo)} \leq \tilde{x}_i^{(up)} \leq x_i^{(up)}$, i=1, ..., n). Of course, a validation procedure on the whole set may be easily applied to any subset. Therefore, value and accuracy bounds on the whole set R will be considered.

The bounds for the mapping function $f$ may be obtained by dividing the rectangle R into a large number of small sub-rectangles, or "cells". That is, each coordinate or axis is discretized with a step $$\tilde{\Delta}_i = \frac{\tilde{x}_i^{(up)} - \tilde{x}_i^{(lo)}}{\tilde{N}_i - 1}.$$

Figure 2:
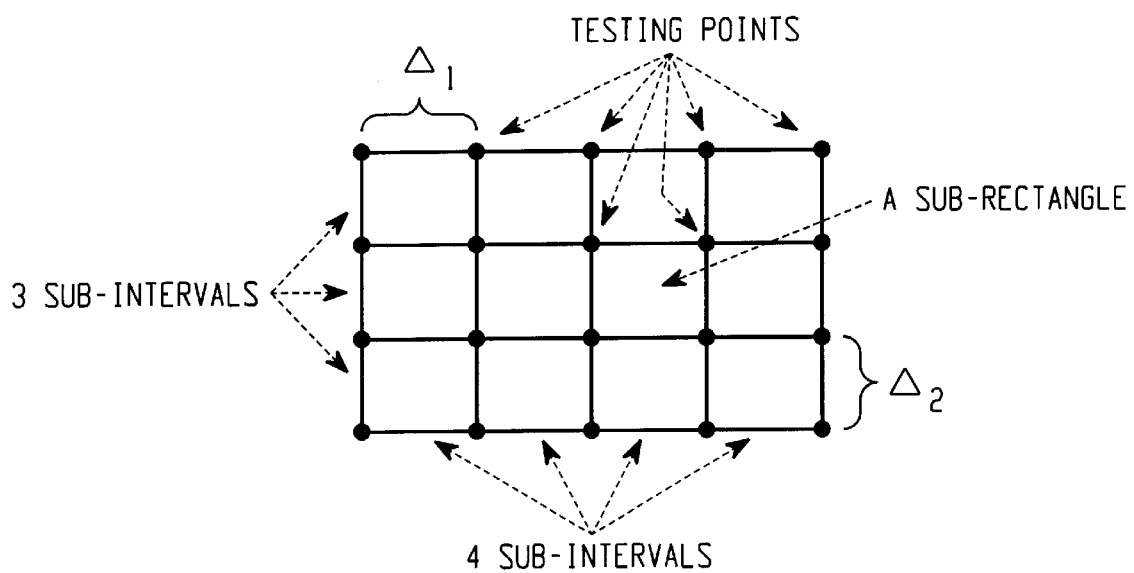
FIG. 2 is an illustration of a two-dimensional case that exemplifies dividing a rectangular domain into cells and a set of test points for use in describing the principles of the present invention.

In FIG. 2 is illustrated a two-dimensional case, with $\tilde{N}_1=5$ and $\tilde{N}_2=4$, in which the rectangle R is divided into 12 rectangular cells, vertices of which constitute a set of 20 testing points.

In each of the resulting cells or sub-rectangles, its $2^n$ vertices are used to calculate a mean value of the look-up table at those vertices $\bar{y}$. Then, as demonstrated in appendix A.6, bounds for value of the function within the sub-rectangle are determined by the expression:

$$\bar{y} - K_f D_{max} \leq f(x) \leq \bar{y} + K_f D_{max}$$

where $D_{max}$ is a constant depending on discretization steps (see appendix A.5). Then, an upper and lower value bound is selected from the plurality of upper and lower bounds of the individual cells, respectively. In the present embodiment, the maximum and minimum of the bounds for individual rectangular cells are selected to obtain the desired value bounds $M_{lo}$, $M_{up}$. The details of this determination are hereinbelow.

The essence of the procedure may be best understood in a one-dimensional case. Each of sub-rectangles is just an interval. A value of function $f$ in two endpoints of each sub-interval may be determined. Lipschitz constant $K_f$ defines two cones of admissible values of $f$, which start at those two endpoints. Because of definition of the Lipschitz constants, it is know that the graph of function $f$ on each of the sub-intervals must lie in the intersection of these two cones. Then the lower and upper bound on each sub-interval is just the highest and the lowest point in the intersection of the admissibility cones. This is described in detail in appendix A.6.

In summary, the verification method contemplated for the present embodiment, evaluates the neural network mapping function over a large set of uniformly spaced testing points, and uses the Lipschitz constants to make inference about all points in between. Albeit, not particularly elegant, this procedure gives guaranteed bounds for the neural network mapping function throughout the whole domain of interest.

The method for determining the error bounds for the mapping functions $f(x)$ and $\phi(x)$ starts again with dividing the rectangle R into a large number of small sub-rectangles, or "cells" such as shown by way of example for the two dimensional case in FIG. 2. The discretization $\Delta_i$ may be chosen such that it coincides with, or is a refinement of the discretization of the look-up table mapping function which is to be replaced. That way it is ensured that look-up table mapping $\phi(x)$ will be differentiable within each sub-rectangle.

Continuing, the Lipschitz constant $K'_f$ is determined for the neural network mapping, so that knowledge of the gradient at the testing points allows inference about gradient values throughout the whole rectangle. Because error bounds are to be determined between $f(x)$ and $\phi(x)$, knowledge of the difference between gradients of the two functions are determined. Strictly speaking, the look-up table mapping is not differentiable everywhere. Therefore, its gradient is calculated separately for each sub-rectangle, restricting $\phi(x)$ only to that sub-rectangle.

Then, for each rectangular cell a local Lipschitz constant $K'_\phi$ is determined for the gradient of the look-up table mapping. Calculation of $K'_\phi$ is described in detail in appendix A.2 supra. This constant, in conjunction with $K'_f$ allows calculating bounds for the error within each rectangular cell $$\bar{e} + G_{min} D_{max} - 1/2(K'_f + K'_\phi) D_{max}^{(2)} \leq f(x) - \phi(x) \leq \bar{e} + G_{max} D_{max} + 1/2(K'_f + K'_\phi) D_{max}^{(2)}$$

Quantities $D_{max}$ and $D_{max}^{(2)}$ depend only on discretization steps, and quantities $G_{min}$, $G_{max}$, and $\bar{e}$ are calculated from values and gradients of $f(x)$ and $\phi(x)$ at all vertices of a sub-rectangle. Detailed formulae are given hereinbelow and derivations can be found in appendix A.7 supra.

After lower and upper bounds for approximation error within each rectangular cell have been determined, a lower and an upper error bound is selected therefrom for the desired error bounds of the mapping functions $f(x)$ and $\phi(x)$. In the present embodiment, the minimum and maximum of these error bound quantities over all cells are selected to obtain the desired lower and upper error bound valid for every point within the domain R.

Figure 3A:
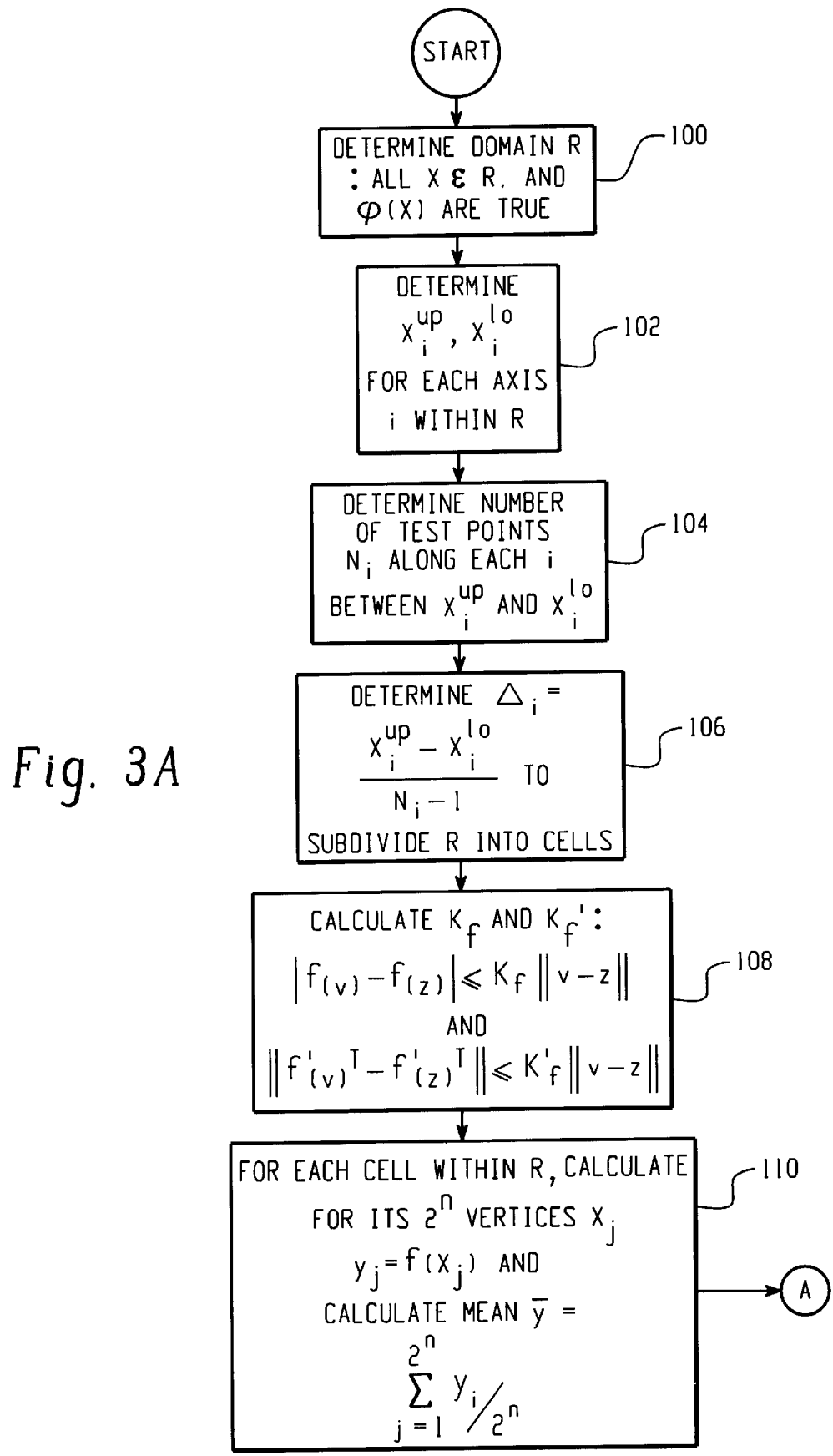
FIGS. 3A and 3B depict a software flowchart suitable for use in programming a digital processor to embody one aspect of the present invention.
Figure 3B:
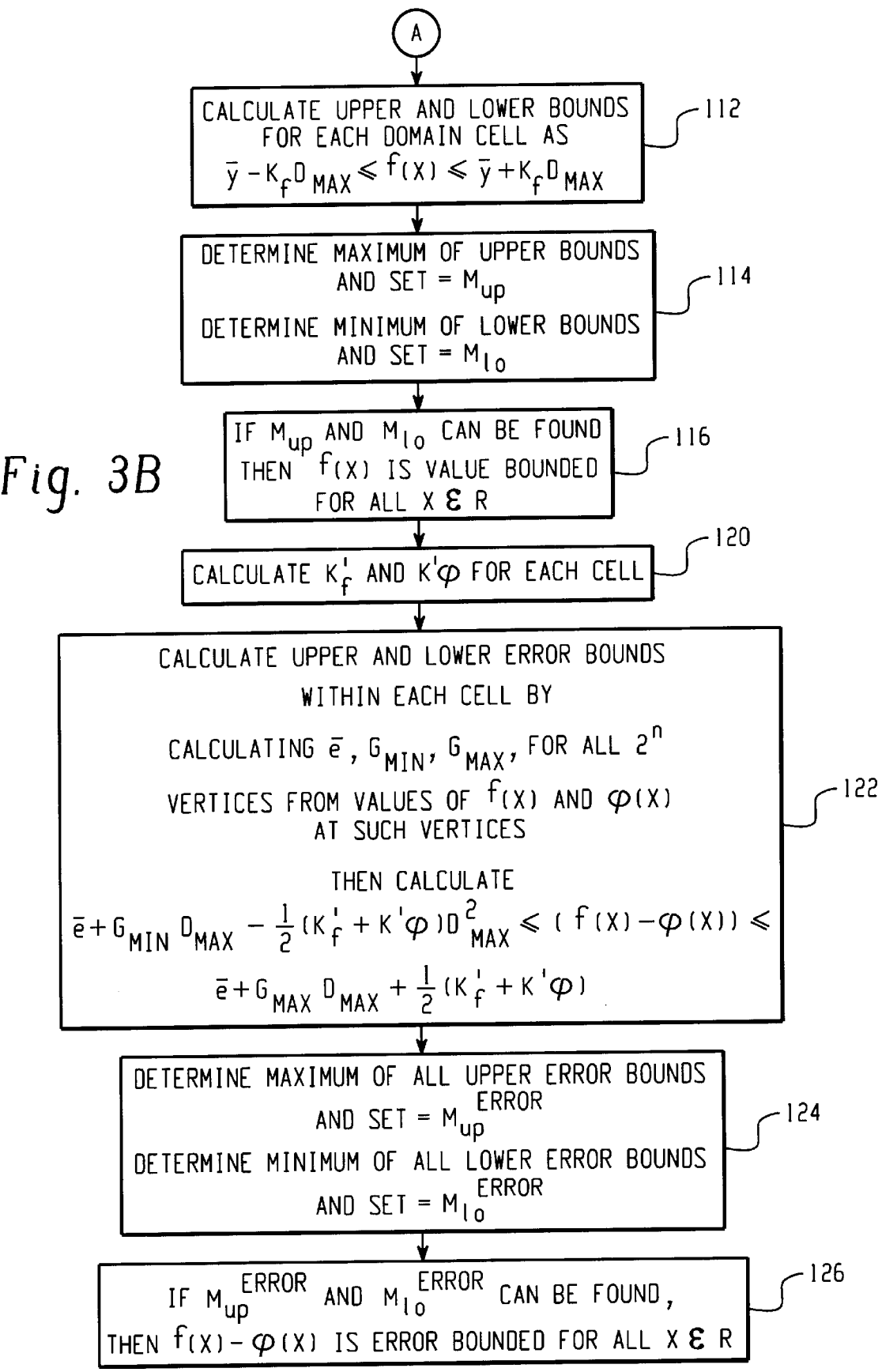
Figure 5A:
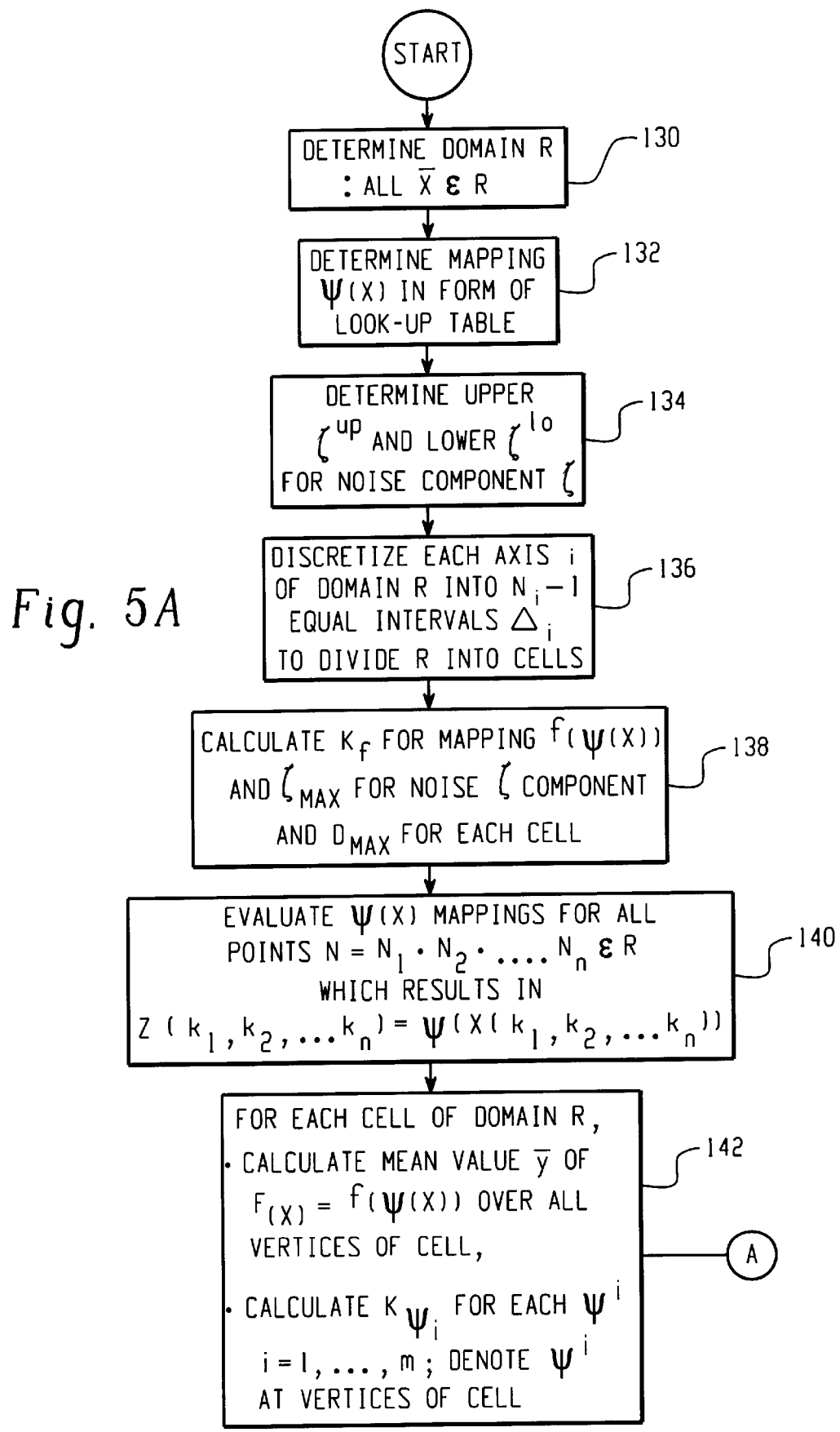
FIGS. 5A, 5B, 5C, and 5D depict a software flowchart suitable for use in programming a digital processor to embody another aspect of the present invention.
Figure 5B:
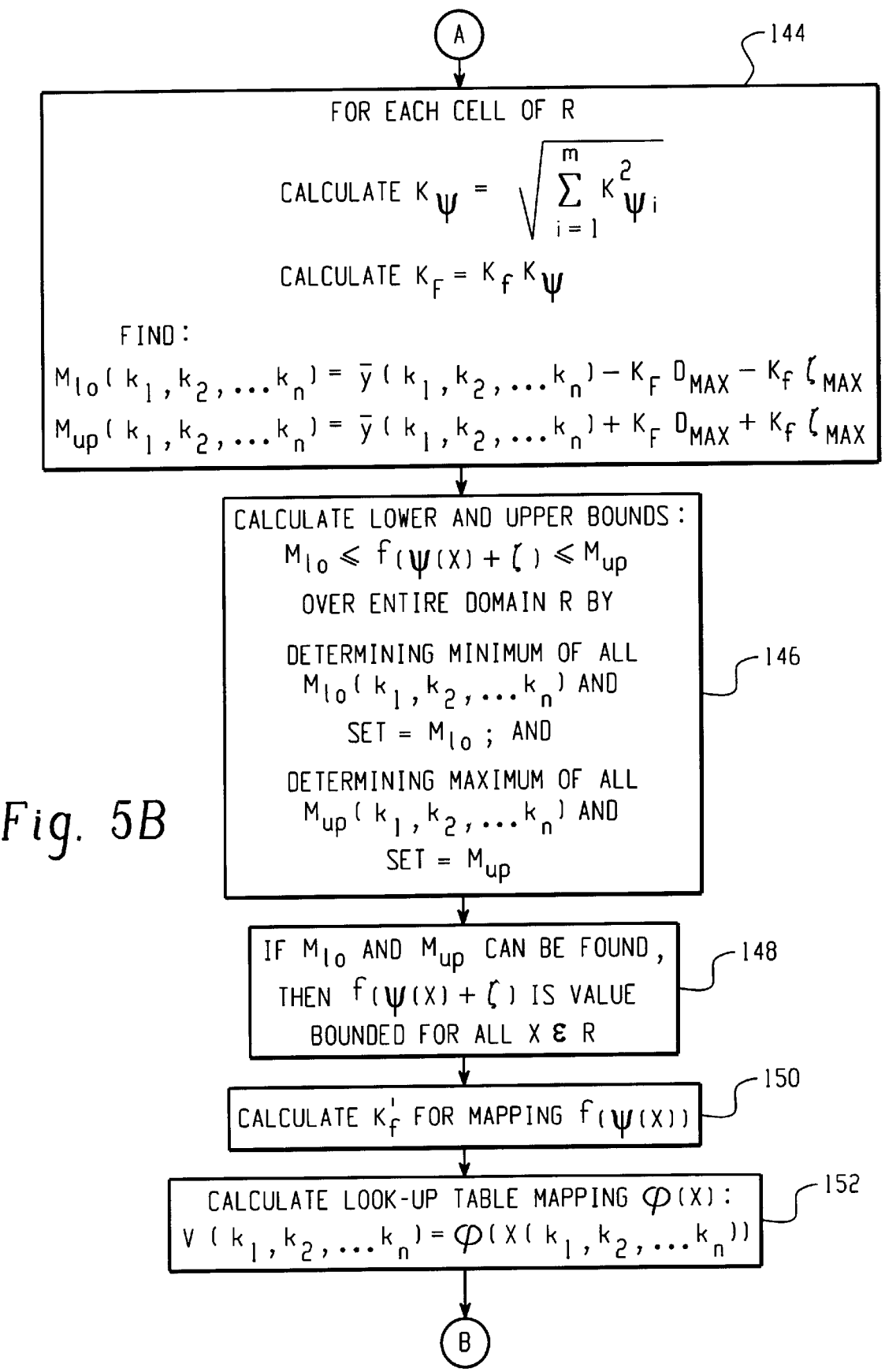
Figure 5C:
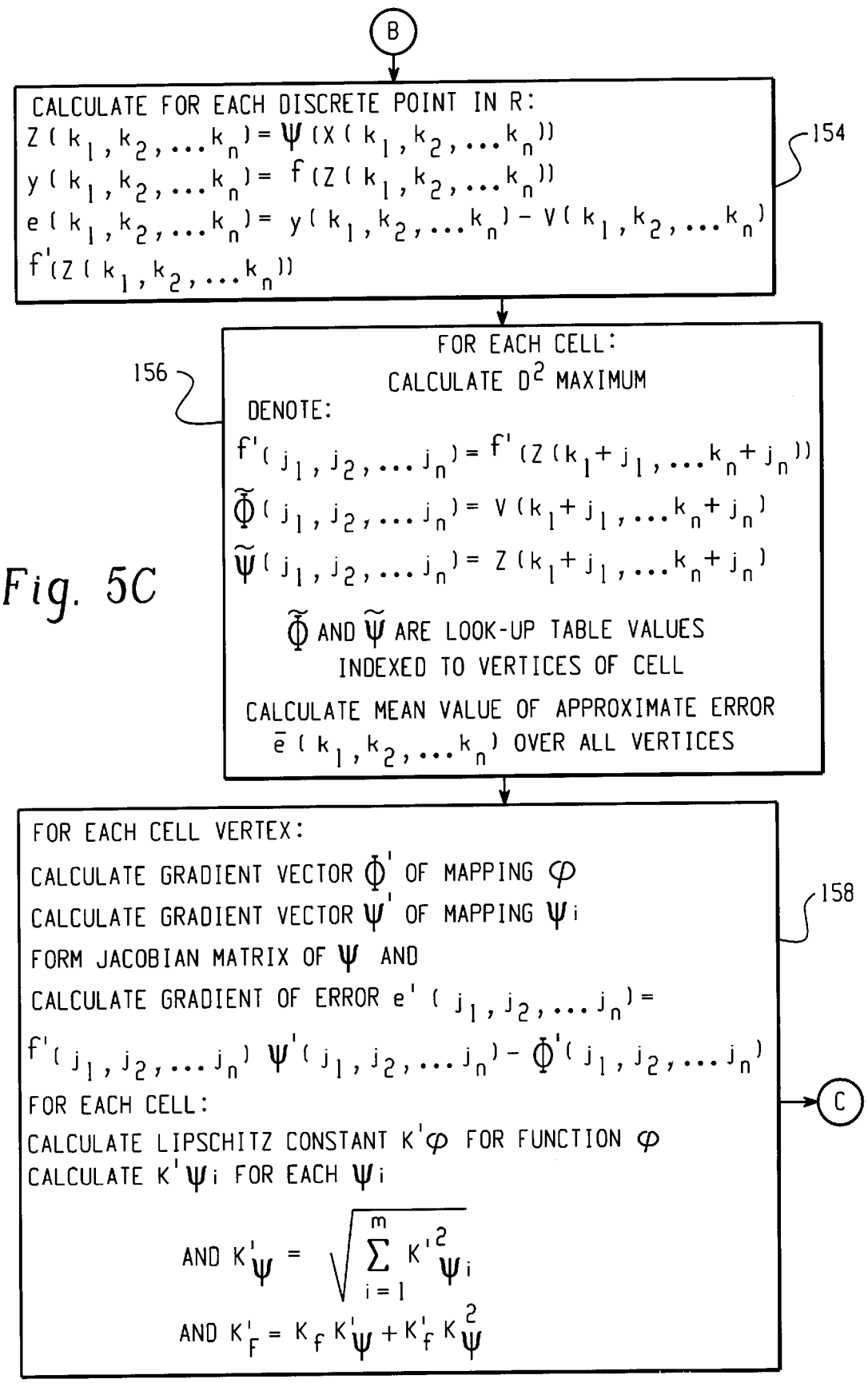
Figure 5D:
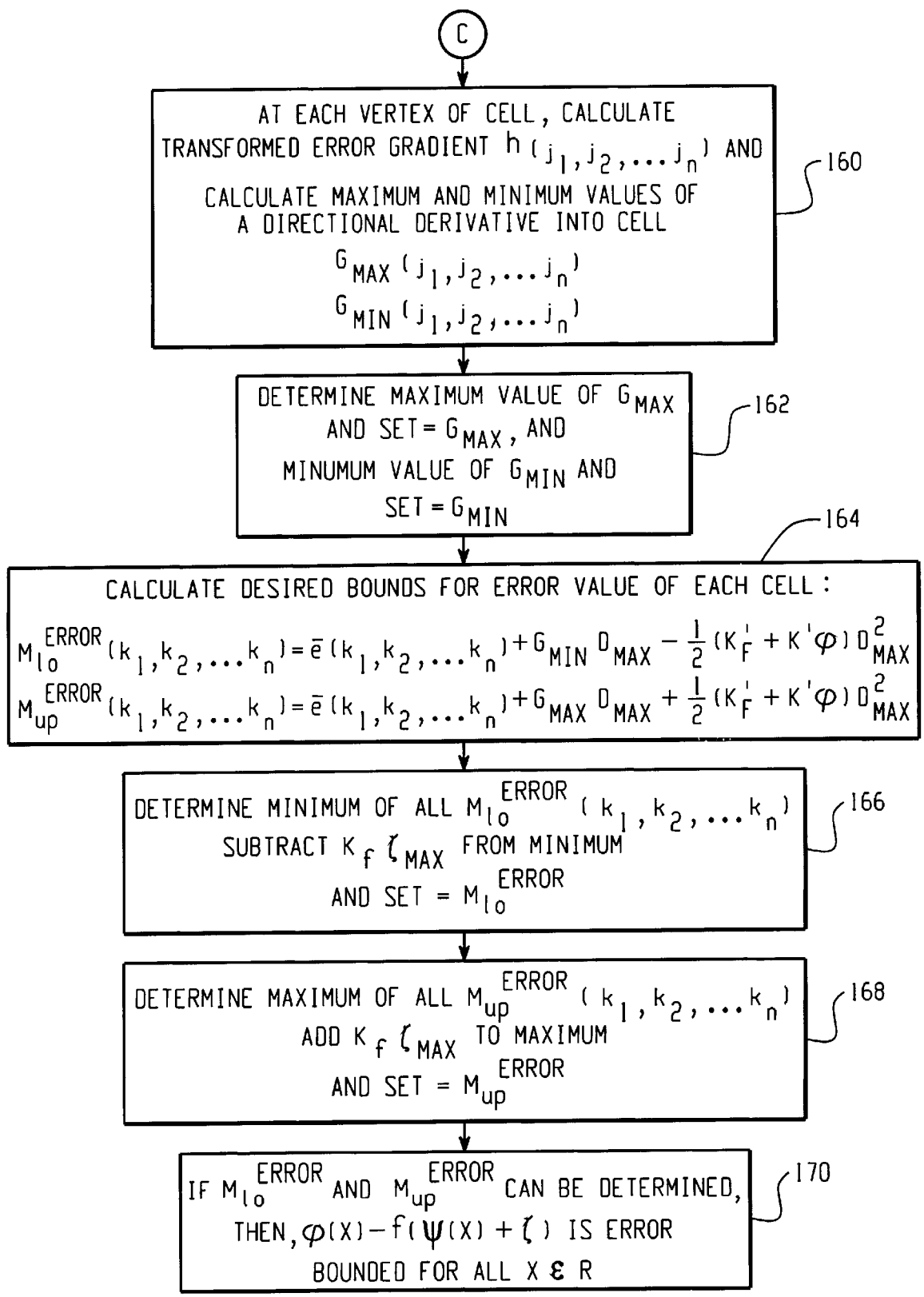

FIGS. 3A and 3B depict an exemplary software flow chart that may be used to program a computer routine that may be executed in a digital computer to verify performance of a previously trained, feedforward (i.e. static) neural network mapping software that approximates a look-up table mapping software implementation defined on a rectangular domain, when the input to the neural net is the same as that of the look-up table. The procedure described below in connection with the exemplary flowchart of FIGS. 3A and 3B provides a basis for actually coding the verification procedures in high level programming language. It is show that by evaluating the neural net finitely many times we can verify with complete certainty its behavior, provided the input is within the specified range. Detailed derivations may be found in the Appendix supra.

Procedure 1 for determining lower and upper bound for values attained by $f(x)$ on rectangle $\tilde{R}$, that is numbers $M_{lo}$, $M_{up}$ such that $$M_{lo} \leq f(x) \leq M_{up}$$

The flowchart of FIGS. 3A and 3B, presume a single layer neural network mapping $f(x)$, specified by weight and bias matrices $W^{(o)}$, $W^{(h)}$, $b^{(h)}$, $b^{(o)}$, and by neuron activation function $\gamma$. A value of the function is calculated as $$f(x) = W^{(o)} \Gamma(W^{(h)} x + b^{(h)}) + b^{(o)}.$$

Referring to the flowchart of FIGS. 3A and 3B, a multi-axis rectangular input domain $\tilde{R}=(\tilde{x}^{(lo)}, \tilde{x}^{(up)})$ is determined by block 100 and upper and lower limits $X_i^{(up)}$ and $X_i^{(lo)}$, respectively, are determined for each axis i within R in block 102. A set of test points for the domain R is determined in blocks 104 and 106 by discretizing each axis of the domain R into $N_i$ test point coordinates and into $\tilde{N}_i-1$ equal intervals of length $\tilde{\Delta}_i$ $$\tilde{\Delta}_i = \frac{x_i^{(up)} - x_i^{(lo)}}{\tilde{N}_i - 1}.$$

Next, a rate-of-growth bound $K_f$ for the neural network mapping function is determined in block 108. A more detailed derivation is provided in appendix A.1 to show that the Lipschitz constant $K_f$ may be determined from the following expressions:

$$K_j = \gamma'_{max}\sqrt{\sum_{i=1}^{p}(w_i^{(o)})^2}\sqrt{\sum_{i=1}^{p}\sum_{j=1}^{n}(w_{i,j}^{(h)})^2}$$

or $$K_f = \gamma'_{max}\sum_{k=1}^{p}|w_k^{(o)}|\sqrt{\sum_{i=1}^{n}(w_{k,i}^{(h)})^2}.$$

In block 110, the neural net mapping at all $\tilde{N}=\tilde{N}_1\tilde{N}_2\ldots\tilde{N}_n$ discretization test points are evaluated $$x(k_1, k_2, \ldots, k_n) = \begin{bmatrix} x_1^{(lo)} + k_1\tilde{\Delta}_1 \\ x_2^{(lo)} + k_2\tilde{\Delta}_2 \\ \vdots \\ x_n^{(lo)} + k_n\tilde{\Delta}_n \end{bmatrix}, 0 \leq k_i < N_i$$

resulting in $\tilde{N}$ function values $$y(k_1, k_2, \ldots, k_n) = f(x(k_1, k_2, \ldots, k_n))$$

Then, for each rectangular cell of the domain, with the "lower-left" vertex $(k_1, k_2, \ldots, k_n)$, $0 \leq k_i < \tilde{N}_i - 1$, a mean value of the function is calculated over all $2^n$ vertices of that cell $$\bar{y}(k_1, k_2, \ldots, k_n) = \frac{1}{2^n}\sum_{j_1=0}^{1}\sum_{j_2=0}^{1}\ldots\sum_{j_n=0}^{1}y(k_1+j_1, k_2+j_2, \ldots, k_n+j_n).$$

Next in block 112, the upper and lower bound for the value of the function within each cell are determined by the following expressions:

$$M_{lo}(k_1, k_2, \ldots, k_n) = \bar{y}(k_1, k_2, \ldots, k_n) - K_f D_{max}$$

$$M_{up}(k_1, k_2, \ldots, k_n) = \bar{y}(k_1, k_2, \ldots, k_n) + K_f D_{max}$$

where the maximal mean distance $D_{max}$ is determined between an arbitrary point and all vertices of the corresponding cell by the following expression:

$$D_{max} = \frac{1}{2^n}\sum_{j_1=0}^{1}\sum_{j_2=0}^{1}\ldots\sum_{j_n=0}^{1}\sqrt{j_1\tilde{\Delta}_1^2 + j_2\tilde{\Delta}_2^2 + \ldots + j_n\tilde{\Delta}_n^2}.$$

The above described expressions are described in greater detail in appendixes A.5 and A.6. In block 114, the lower and upper bounds for the values of function $f$ over the entire rectangle $\tilde{R}$ are determined by selecting the minimum of the lower value bounds and the maximum of the upper value bounds of the cells according to the following expressions:

$$M_{lo} = \min_{k_1, k_2, \ldots, k_n} M_{lo}(k_1, k_2, \ldots, k_n)$$

$$M_{up} = \min_{k_1, k_2, \ldots, k_n} M_{lo}(k_1, k_2, \ldots, k_n).$$

Thus, according to block 116, if the values of the upper and lower bounds can be determined, then the function $f(x)$ is value bounded for all $x \in R$.

If the uncertainty margin $K_f D_{max}$ is too large when compared to maximal and minimal value on the domain of the test points, the discretization steps $\Delta_i$ may be decreased for some (or all) coordinates, and the procedure repeated (possibly reusing, after necessary re-labeling, some of the previously calculated values of the neural network mapping). At a cost of slightly less tight (more conservative) bounds, computational cost of the software may be reduced if mean values of y are replaced by maximal and minimal values over whole testing set. Then a step in the procedure may be eliminated, since:

$$M_{lo} = \min_{k_1, k_2, \ldots, k_n} M_{lo}(k_1, k_2, \ldots, k_n) - K_f D_{max}$$

$$M_{up} = \min_{k_1, k_2, \ldots, k_n} M_{lo}(k_1, k_2, \ldots, k_n) + K_f D_{max}$$

Procedure 2 for determining lower and upper bound for approximation error between known look-up table function $\phi(x)$ and neural net mapping $f(x)$, that is numbers $M_{lo}^{error}$, $M_{up}^{error}$ such that $$M_{lo}^{error} \leq f(x) - \phi(x) \leq M_{up}^{error}$$

Steps defined in blocks 100 through 110 may be repeated for the instant procedure. Next, in block 120, the rate-of-growth bound or Lipschitz constant $K'_f$ for the neural net mapping is determined by the following expression:

$$K'_f = \gamma''_{max}\sqrt{\sum_{i=1}^{p}(w_i^{(o)})^2\sum_{i=1}^{p}\sum_{j=1}^{n}(w_{i,j}^{(h)})^2}$$

or $$K'_f = \gamma''_{max}\sqrt{\sum_{k=1}^{n}\left(\sum_{j=1}^{p}|w_j^{(o)}||w_{j,k}^{(h)}|\sqrt{\sum_{i=1}^{n}(w_{j,i}^{(h)})^2}\right)^2}$$

More details of the above expressions are derived in appendix A.1.

Also in block 120, the value of the Lipschitz constant $K_\phi'$ is determined for each cell (refer to appendix A.2) from the value of the look-up table mapping $$v(k_1, k_2, \ldots, k_n) = \phi(x(k_1, k_2, \ldots, k_n))$$

and the error value $$e(k_1, k_2, \ldots, k_n) = y(k_1, k_2, \ldots, k_n) - v(k_1, k_2, \ldots, k_n)$$

and the gradient vector of the neural network mapping $$f'(x(k_1, k_2, \ldots, k_n))$$

by the following method:

At each vertex of a cell, calculate Hessian matrix $\Phi''(j_1, j_2, \ldots, j_n)$, whose elements are given by:

$$\Phi''_{lm}(j_1, j_2, \ldots, j_n) = \frac{1 - 2j_m}{\Delta_m}(\Phi'_l(j_1, \ldots, 1-j_m, \ldots, j_n) - \Phi'_l(j_1, \ldots, j_n))$$

Next, find an upper bound for each element of the Hessian over all cell vertices $$\Phi''_{l,m \max} = \max_{\substack{j_1 = 0,1 \\ \vdots \\ j_n = 0,1}} |\Phi''_{l,m}(j_1, j_2, \ldots, j_n)|$$

Then calculate the desired Lipschitz constant valid within the current cell by the expression:

$$K'_\phi = \sqrt{\sum_{l=1}^{n} \sum_{m=1}^{n} (\Phi''_{l,m \max})^2}.$$

In block 122, the mean value of e, $G_{max}$ and $G_{min}$ of the cell is determined by the following method:

Calculate maximal mean square distance between an arbitrary point and all vertices of the corresponding cell, as derived in appendix A.5

$$D^{(2)}_{\max} = \frac{1}{2}\sum_{j=1}^{n} \tilde{\Delta}_i^2$$

For each cell of the lattice, with the "lower-left" vertex $(k_1, k_2, \ldots, k_n)$, $0 \leq k_i < N_i - 1$, perform the following:

Denote the values of $f'$ and $\phi$ at the $2^n$ vertices of the current cell as:

$$f'(j_1, \ldots, j_n) = f'(x(k_1+j_1, \ldots, k_n+j_n))$$

$$\Phi(j_1, \ldots, j_n) = v(k_1+j_1, \ldots, k_n+j_n)$$

Use $\Phi(j_1, \ldots, j_n)$ for the look-up table values indexed relative to the current cell, in order to distinguish them from values $\Phi(k_1, \ldots, k_n)$ indexed relative to the whole table. alculate the mean value of error e over all vertices of the current cell $$\bar{e}(k_1, k_2, \ldots, k_n) = \frac{1}{2^n} \sum_{j_1=0}^{1} \sum_{j_2=0}^{1} \ldots \sum_{j_n=0}^{1} e(k_1+j_1, k_2+j_2, \ldots, k_n+j_n)$$

For each of the cell vertices, calculate gradient of the look-up table mapping restricted to that cell $$\Phi'(j_1, j_2, \ldots, j_n)^T = \begin{bmatrix} \frac{1-2j_1}{\Delta_1}(\Phi(1-j_1, j_2, \ldots, j_n) - \Phi(j_1, j_2, \ldots, j_n)) \\ \frac{1-2j_2}{\Delta_2}(\Phi(j_1, 1-j_2, \ldots, j_n) - \Phi(j_1, j_2, \ldots, j_n)) \\ \vdots \\ \frac{1-2j_n}{\Delta_n}(\Phi(j_1, j_2, \ldots, 1-j_n) - \Phi(j_1, j_2, \ldots, j_n)) \end{bmatrix}$$

and find the gradient of the error mapping $$e'(j_1, j_2, \ldots, j_n) = f'(j_1, j_2, \ldots, j_n) - \Phi'(j_1, j_2, \ldots, j_n)$$

At each vertex find the transformed error gradient, as discussed in appendix A.7

$$h(j_1, j_2, \ldots, j_n) = e'(j_1, j_2, \ldots, j_n) \begin{bmatrix} 1-2j_1 & 0 & \ldots & 0 \\ 0 & 1-2j_2 & \ldots & 0 \\ \vdots & \vdots & \ddots & \vdots \\ 0 & 0 & \ldots & 1-2j_n \end{bmatrix}$$

to and calculate maximal and minimal values of directional derivative within the cell $$g_{\max}(j_1, \ldots, j_n) = \min\left(0, \max_i h_i(j_1, \ldots, j_n)\right) + \sqrt{\sum_{i=1}^{n}(\max(0, h_i(j_1, \ldots, j_n)))^2}$$

$$g_{\min}(j_1, \ldots, j_n) = \max\left(0, \min_i h_i(j_1, \ldots, j_n)\right) - \sqrt{\sum_{i=1}^{n}(\min(0, h_i(j_1, \ldots, j_n)))^2}$$

Find bounds for the values of directional derivative within the cell $$G_{\max} = \max_{\substack{j_1=0,1 \\ \vdots \\ j_n=0,1}} g_{\max}(j_1, \ldots, j_n)$$

$$G_{\min} = \min_{\substack{j_1=0,1 \\ \vdots \\ j_n=0,1}} g_{\min}(j_1, \ldots, j_n)$$

Also in block 122, the desired bounds for the error value within the current cell are determined, as derived in appendix A.7

$$M_{lo}^{error}(k_1, \ldots, k_n) = \bar{e}(k_1, \ldots, k_n) + G_{min}G_{max} - 1/2(K'_f + K'_\phi)D_{max}^{(2)}$$

$$M_{up}^{error}(k_1, \ldots, k_n) = \bar{e}(k_1, \ldots, k_n) + G_{max}D_{max} + 1/2(K'_f + K'_\phi)D_{max}^{(2)}$$

Next in block 124, the lower and upper bounds for the error values over the entire rectangle are determined from the upper and lower bounds of the cells of the rectangular domain according to the following expressions:

$$M_{lo}^{error} = \min_{k_1, k_2, \ldots, k_n} M_{lo}^{error}(k_1, k_2, \ldots, k_n)$$

$$M_{up}^{error} = \max_{k_1, k_2, \ldots, k_n} M_{up}^{error}(k_1, k_2, \ldots, k_n)$$

Thus, according to block 126, if the upper and lower error bounds can be found by the foregoing described procedure, then $f(x) - \phi(x)$ is error bounded for all $x \in R$.

If the uncertainty margins $$G_{max} D_{max} + 1/2 (K'_f + K'_\psi) D_{max}^{(2)}$$

$$G_{min} D_{max} - 1/2 (K'_f + K'_\psi) D_{max}^{(2)}$$

are too large when compared to maximal and minimal value in a cell, the discretization steps $\Delta_i$ may be decreased for some (or all) coordinates, and the procedure repeated (possibly reusing, after necessary re-labeling, some of the previously calculated values).

Organization of software calculations in the above procedure is geared more towards ease of interpretation than towards software computational efficency. A large portion of the arithmetic software operations in neighboring cells is identical—this aplies particularly to gradient calculations. Smart reuse of those values in the software execution from cell to cell may reduce computation time.

Verification of A Neural Net—Case Of "Black-Box" Estimator

The case presented in the previous section was simple because of two reasons. Firstly, the domain of input signals was rectangular. Secondly, for each particular input value, the desired, or "true" output value was known or readily calculable via a look-up table. These two assumptions do not hold in the case of "black-box" estimator, which will be discussed now. Because signals from redundant sensors of a given process are correlated, the input domain is not rectangular. More importantly, due to measurement noises, the desired, optimal estimate for any particular input is difficult to calculate. One of the advantages of the neural network mapping approach to state estimation is that during the training process the neural net learns to calculate a statistically (almost) optimal estimate of the desired quantity, which obviates necessity to perform any direct optimization. As a consequence, though, it is not known what the true optimal answer should be, and therefore there is no reference value by which to judge the neural net performance. In this section, there is described a method to circumvent these difficulties, and to verify performance of a neural net "blackbox" estimator.

Let a neural net be trained to provide an estimate of the quantity of interest y, based on a set of m measurements z, $y = f(z)$. The training set, containing pairs $(z^{(i)}, y^{(i)})$, may be generated by a computer simulation model, where values of z represent modeled output signals of sensors, possibly including random measurement noise of a given process. Each particular value of z may be calculated for some specific values of parameters describing the environment of the process, and the corresponding value of the desired output y may be calculated for the same values of the environmental parameters. This underlying n-dimensional vector of parameters is referred to as the state of the process or system, and denoted as x.

The computer simulation model (the data generator) implements two transformations—for any given state, x it calculates the desired or true output of the estimator, $y = \phi(x)$, and the (noisy) estimated output values of sensors $z = \psi(x) + \zeta$. In the context of an aircraft fuel measurement process or application, like that described in the copending patent application Ser. No. 08/996,858, entitled "Liquid Gauging Using Sensor Fusion and Data Fusion" and assigned to the same assignee as the instant application, the state x of an aircraft fuel tank, by way of example, may consist of two attitude angles, height of the fuel surface over a reference point, fuel temperature, and magnitude of the acceleration vector. In this same example, measurement vector z may include pressure, temperature, acceleration, and ultrasonic time of flight values. Moreover, the desired output value y can be the fuel quantity or mass within at least one fuel tank of the aircraft.

The rational behind introducing the concept of state x is that its components can change independently of each other, and the set of possible state values can be specified as a rectangle again Thus, we have the following situation: the "true", desired value of the estimator is calculated as a known function of state $y(true) = \phi(x)$. The actual output of the neural net estimator $y(est.) = f(z + \zeta)$ is calculated as a function of the sensor values $z = \psi(x)$, which in turn are functions of state contaminated by sensor noise $\zeta$. This mapping concept is illustrated graphically in FIG. 4.

Figure 4:
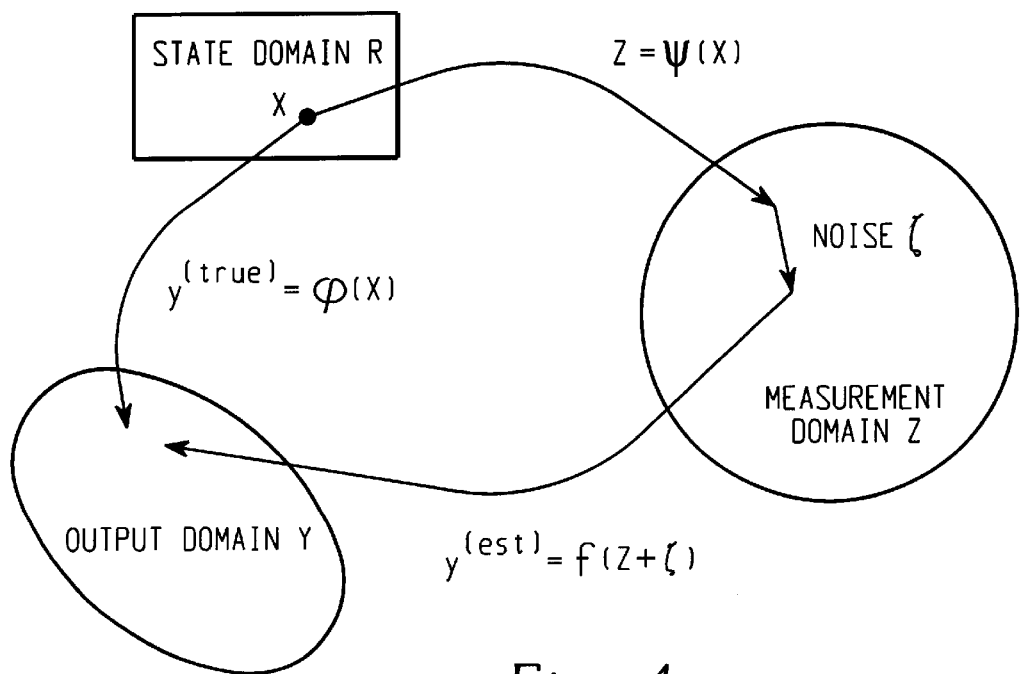
FIG. 4 is a graphical illustration of a mapping suitable for use in explaining another aspect of the present invention.

Referring to FIG. 4, the composition of the measurement transformation $\psi(x)$ is defined with the neural net $f(z)$, i.e. $F(x) = f(\psi(x))$. This new mapping is defined on the same rectangular domain R as the known mapping $\phi(x)$. Therefore, in absence of measurement noise, verification of the neural net is equivalent to verification of mapping $F(x)$. If there is measurement noise, it is shown in appendix A.8 how to decompose estimation error $f(\psi(x) + \zeta) - \phi(x)$ into the noise-free error $F(x) - \phi(x)$, and a term dependent on noise magnitude $\|\zeta\|$.

In the present embodiment, calculations of the sensor outputs z, and of the desired output y(true) from state x, may involve usage of a fuel tank geometry model implemented in software in the form of an interpolated look-up table mapping. Therefore, for the present embodiment, both transformations $\phi(x)$ and $\psi(x)$ within the computer simulation model are coded in the form of look-up tables. That is, their values are calculated as:

$$\varphi(x) = \frac{1}{\prod_{i=1}^{n} \Delta_i} \sum_{j_1=0}^{1} \sum_{j_2=0}^{1} \ldots \sum_{j_n=0}^{1} \Phi(k_1 + j_1, \ldots, k_n + j_n) \prod_{i=1}^{n} \delta_i^{j_i}, \text{ and}$$

$$\psi^{(i)}(x) = \frac{1}{\prod_{i=1}^{n} \Delta_i} \sum_{j_1=0}^{1} \sum_{j_2=0}^{1} \ldots \sum_{j_n=0}^{1} \Psi^{(i)}(k_1 + j_1, \ldots, k_n + j_n) \prod_{i=1}^{n} \delta_i^{j_i},$$

where $\Phi$ and $\psi^{(i)}$ denote look up table entries, and $\delta_i^{j_i}$ are distances from cell walls, as defined infra. While this may not be the most efficient way of implementing these transformations, it allows simplifying our developments and utilizing techniques herein described. In particular, it guarantees that gradients of $\phi$ and $\psi$ can be evaluated exactly within each cell via finite differencing. On the other hand, the neural network estimator may be verified with respect to the interpolated approximate mappings, rather than the actual nonlinear transformations. Accuracy of such interpolation is obviously affected by the size of the discretization step used to construct the look-up tables. However, since the look-up table approach is well understood and accepted within the industry, it is not necessary to address those issues herein.

An important part of the present method is the calculation of Lipschitz constants $K_\psi$ and $K'_\psi$ for m-valued transformation ψ(x) and its Jacobian. How this is done within each separate cell of discretization domain is shown in appendix A.3. Then, the Lipschitz constants $K_F$ and $K'_F$ for the composite transformation F(x) may be calculated as shown in appendix A.4. After this is done, the verification-method is virtually identical with that described above for the look up table replacement case. For each sub-rectangle or cell of the original state domain R, lower and upper bounds for values of F(x), or for error F(x)−φ(x) are calculated, depending whether we solve the value bounding problem, or approximation error problem (as described hereinabove). Finally, the minimum and maximum of the derived local bounds are taken over all sub-rectangles, to obtain global bounds valid everywhere within the state domain R.

The foregoing described method gives us guaranteed performance bounds for the noiseless case. To incorporate the effects of measurement noise, noise bounds $\zeta^{(lo)}$ and $\zeta^{(up)}$ on the possible values of measurement errors are determined in order to calculate maximal norm of noise term $\zeta_{max}$. Then, the term $\pm K_f \zeta_{max}$ is added to the derived error bounds determined for the noiseless case. Detailed formulae for the above are given in the procedures described hereinbelow.

The verification method outlined above allows calculation of guaranteed performance bounds for a neural net estimator under one important qualification. It has to be remembered that those bounds are derived relative to the computer simulation model of the measurement transformation ψ(x) and the output transformation φ(x). If these two transformations describe the measurement system (e.g. an aircraft tank) accurately, then our verification procedure allows us to infer that the neural net output ƒ(z) will indeed approximate closely the desired output φ(x). If, however, the simulation model, used to generate the training and testing data, is inaccurate, then the neural net will be inaccurate as well.

In summary, the approach, in the preferred embodiment, is to show equivalence of a neural net to some other nonlinear function, such as a look-up table, for example. This systematic procedure calculates, in a finite number of steps, the maximal distance between values of the neural net and of the look-up table mapping functions. Thus, if the look-up table mapping is valid, then the neural net mapping is also valid. Then, the task to certify a neural net will be equivalent to certifying the look-up table.

A related issue is the range of neural net inputs. The bounds are guaranteed to hold if the input to the neural net estimator lies in the range of ψ(x)+ζ. In other words, the sensor outputs should be accurately modeled by the simulation equations ψ(x), the measurement noise should not exceed bounds $\zeta^{(lo)}$ and $\zeta^{(up)}$, and the true state must lie within the rectangle R. Then, the accuracy of the neural net estimator will be true. If we expect that the simulation model is inaccurate, we may increase the noise bounds $\zeta^{(lo)}$ and $\zeta^{(up)}$, so that discrepancy between the actual and calculated sensor signals will always satisfy $$\zeta^{(lo)} \leq z - \psi(x) \leq \zeta^{(up)}.$$

The above condition may mean that for certification of a neural net estimator, the computer simulation model or data generator ψ(x) and φ(x) should be certified as well, together with the physical sensors, so that closeness of ψ(x) and actual measurement z is assured.

FIGS. 5A through 5D depict an exemplary software flow chart for use in programming a computer routine that may be executed in a digital computer to verify performance of a previously trained, feedforward (i.e. static) neural network mapping software that approximates a look-up table mapping software implementation defined on a rectangular domain, when the input to the neural net is the same as that of the look-Lip table, and redundant and noisy measurements fed to the neural net. The procedure described below in connection with the exemplary flowchart of FIGS. 5A through 5D provides a basis for actually coding the verification procedures in high level programming language. It is shown that by evaluating the neural net finitely many times we can verify with complete certainty its behavior, provided the input is within the specified range. Detailed derivations may be found in the Appendix supra.

Procedure 3 for determining the lower and upper bound for values attained by composition of measurement transformation ψ and neural net ƒ on rectangle $\tilde{R}$, including measurement noise ζ; that is numbers $M_{lo}$, $M_{up}$ such that $$M_{lo} \leq f(\psi(x) + \zeta) \leq M_{up},$$

for any state vector x∈$\tilde{R}$, and for any noise vector $\zeta^{(lo)} \leq \zeta \leq \zeta^{(up)}$. By way of example, the procedure is for a single layer neural net mapping ƒ(z), specified by weight and bias matrices $W^{(o)}$, $W^{(h)}$, $b^{(h)}$, $b^{(o)}$, and by neuron activation function γ as explained before. A value of the function is calculated as $$f(x) = W^{(o)} \Gamma(W^{(h)} z + b^{(h)}) + b^{(o)}.$$

Referring to FIGS. 5A–5D, in block 130, a rectangular state domain $\tilde{R} = (\tilde{x}^{(lo)}, \tilde{x}^{(up)})$ is determined, and in block 132, a transformation mapping ψ(x) is determined to transform an n-dimensional state vector x into an m-dimensional measurement vector z, preferably in form of a look-up table mapping. Next, in block 134, upper and lower bounds $\zeta^{(up)}$ and $\zeta^{(lo)}$ for an additive measurement noise component ζ is determined. In block 136, each state axis or coordinate i is discretized into $N_i$ test point coordinates and $\tilde{N}_i - 1$ equal intervals with length $\Delta_i$ such that $$\tilde{\Delta}_i = \frac{x_i^{(up)} - x_i^{(lo)}}{\tilde{N}_i - 1}.$$

Continuing, in block 138 is calculated a rate-of-growth bound or Lipschitz constant $K_f$ for the neural net mapping, as derived in appendix A1 by the equation:

$$K_f = \gamma'_{max} \sqrt{\sum_{i=1}^{p} (w_i^{(o)})^2} \sqrt{\sum_{i=1}^{p} \sum_{j=1}^{n} (w_{i,j}^{(h)})^2}$$

or $$K_f = \gamma'_{max} \sum_{k=1}^{p} |w_k^{(o)}| \sqrt{\sum_{i=1}^{n} (w_{k,i}^{(h)})^2}.$$

Also, calculated in block 138 is a maximal value for norm of noise vector ζ

$$\zeta_{max} = \sqrt{\sum_{i=1}^{m} (\max(|\zeta_i^{(lo)}|, |\zeta_i^{(up)}|))^2}$$

and the maximal mean distance between a point and all vertices of the corresponding cell, as derived in appendix A.5

$$D_{max} = \frac{1}{2^n} \sum_{j_1=0}^{1} \sum_{j_2=0}^{1} \ldots \sum_{j_n=0}^{1} \sqrt{j_1 \tilde{\Delta}_1^2 + j_2 \tilde{\Delta}_2^2 + \ldots + j_n \tilde{\Delta}_n^2}.$$

Block 140 evaluates the look-up table measurement mapping at all $\tilde{N}=\tilde{N}_1 \tilde{N}_2 \ldots \tilde{N}_n$ discretization points $$x(k_1, k_2, \ldots, k_n) = \begin{bmatrix} x_1^{(lo)} + k_1 \tilde{\Delta}_1 \\ x_2^{(lo)} + k_2 \tilde{\Delta}_2 \\ \vdots \\ x_n^{(lo)} + k_n \tilde{\Delta}_n \end{bmatrix}, 0 \le k_i < N_i,$$

which results in $\tilde{N}$ measurement vectors $$z(k_1, k_2, \ldots, k_n) = \psi(x(k_1, k_2, \ldots, k_n)),$$

also the neural net mapping is further evaluated at all calculated mesurement vectors $$z(k_1, k_2, \ldots, k_n), 0 \le k_i < N_i$$

which results in $\tilde{N}$ output values $$y(k_1, k_2, \ldots, k_n) = f(z(k_1, k_2, \ldots, k_n)) = f(\psi(x(k_1, k_2, \ldots, k_n))).$$

Now, for each cell of the rectangular domain, with the "lower-left" vertex $(k_1, k_2, \ldots, k_n)$, $0 \le k_i < \tilde{N}_i - 1$, block 142 calculates the mean value of the composite function $F(x) = f(\psi(x))$ over all vertices of the cell $$\bar{y}(k_1, k_2, \ldots, k_n) = \frac{1}{2^n} \sum_{j_1=0}^{1} \sum_{j_2=0}^{1} \ldots \sum_{j_n=0}^{1} y(k_1+j_1, k_2+j_2, \ldots, k_n+j_n),$$

and, for each measurement transformation $\psi^{(i)}$, $i=1, \ldots, m$, calculates Lipschitz constant $K_{\psi i}$, as derived in appendix A.2 by the following method:

(a) denote values of the coordinate mapping $\psi^{(i)}$ at the vertices of the current cell as:

$$\psi^{(i)}(j_1, j_2, \ldots, j_n) = z_i(k_1+j_1, k_2+j_2, \ldots, k_n+j_n)$$

(b) for each vertex of the cell, calculate gradient vector of tvi restricted to the curent cell $$\Psi'^{(i)}(j_1, j_2, \ldots, j_n)^T =$$

$$\begin{bmatrix} \frac{1-2j_1}{\Delta_1}(\Psi^{(i)}(1-j_1, j_2, \ldots, j_n) - \Psi^{(i)}(j_1, j_2, \ldots, j_n)) \\ \frac{1-2j_2}{\Delta_2}(\Psi^{(i)}(j_1, 1-j_2, \ldots, j_n) - \Psi^{(i)}(j_1, j_2, \ldots, j_n)) \\ \ldots \\ \frac{1-2j_n}{\Delta_n}(\Psi^{(i)}(j_1, j_2, \ldots, 1-j_n) - \Psi^{(i)}(j_1, j_2, \ldots, j_n)) \end{bmatrix}$$

(c) calculate maximal absolute values for all components of $\psi'^{(i)}$ over all cell vertices $$\Psi'^{(i)}_{lmax} = \max_{\substack{j_1=0,1 \\ j_2=0,1 \\ \vdots \\ j_n=0,1}} |\Psi'^{(i)}_l(j_1, j_2, \ldots, j_n)|, \text{ and then,}$$

(d) compute a bounding constant for the cell in question $$K_{\psi i} = \sqrt{\sum_{l=1}^{m} (\Psi'^{(i)}_{lmax})^2}.$$

In block 144, a Lipschitz constant $K_\psi$ is calculated for the m-dimensional mapping $\psi$ restricted to the current cell, as derived in appendix A.3

$$K_\psi = \sqrt{\sum_{i=1}^{m} K_{\psi i}^2},$$

and a constant $K_F$ is calculated for the composite mapping F restricted to the current cell, as derived in appendix A.4

$$K_F = K_f K_\psi.$$

Also, in block 144, the upper and lower bound for the value of the function $f$ is determined for each cell, as derived in appendix A.6 and A.7

$$M_{lo}(k_1, k_2, \ldots, k_n) = \bar{y}(k_1, k_2, \ldots, k_n) - K_F D_{max} - K_f \zeta_{max}$$

$$M_{up}(k_1, k_2, \ldots, k_n) = \bar{y}(k_1, k_2, \ldots, k_n) + K_F D_{max} + K_f \zeta_{max}$$

In addition, block 146 determines lower and upper bounds for the values of function $f$ over the entire rectangle $\tilde{R}$ by determining minimum and maximums as follows:

$$M_{lo} = \min_{k_1, k_2, \ldots, k_n} M_{lo}(k_1, k_2, \ldots, k_n)$$

$$M_{up} = \max_{k_1, k_2, \ldots, k_n} M_{up}(k_1, k_2, \ldots, k_n).$$

Thus, it follows in block 148 that if the upper and lower value bounds of the domain R can be found, then the function $f$ is value bounded for all $x \in R$.

Note that here the uncertainty margin $K_f D_{max} + K_f \zeta_{max}$ cannot be arbitrarily reduced by simply refining discretization of the state space. The assumed maximal size $\zeta_{max}$ of the noise vector determines the worst case inaccuracy of measurements and uncertainty of final output.

Procedure 4 for determining lower and upper bounds for approximation error between a computer simulation model which may be a known look-up table function $\phi(x)$ and the composition of $\psi(x)$ and $f(z)$ on rectangle $\tilde{R}$, including measurement noise $\zeta$; that is, numbers $M_{lo}$, $M_{up}$ such that $$M_{lo} \le f(\psi(x)+\zeta) - \phi(x) \le M_{up}$$

for any state vector $x \in \tilde{R}$, and for any noise vector $\zeta^{(lo)} \le \zeta \le \zeta^{(up)}$. The procedure is once again for a single layer neural net mapping $f(z)$, specified by weight and bias matrices $W^{(o)}$, $W^{(h)}$, $b^{(h)}$, $b^{(o)}$, and by neuron activation function $\gamma$ as explained before. A value of the function is calculated as $$f(z) = W^{(o)} \Gamma(W^{(h)} z + b^{(h)}) + b^{(o)}.$$

Referring again to FIGS. 5A–5D, for this procedure blocks of the flowchart 130 through 144 may be repeated and in block 150, the rate-of-growth bound or Lipschitz constants $K_f$ and $K'_f$ are calculated for the neural net mapping f, as derived in appendix A.1:

$$K_f = \gamma'_{max} \sqrt{\sum_{i=1}^{p}(w_i^{(o)})^2} \sqrt{\sum_{i=1}^{p}\sum_{j=1}^{m}(w_{i,j}^{(h)})^2}$$

$$K'_f = \gamma''_{max} \sqrt{\sum_{i=1}^{p}(w_i^{(o)})^2} \sum_{i=1}^{p}\sum_{j=1}^{m}(w_{i,j}^{(h)})^2$$

or $$K_f = \gamma'_{max} \sum_{k=1}^{p}|w_k^{(o)}| \sqrt{\sum_{i=1}^{n}(w_{k,i}^{(h)})^2}$$

$$K'_f = \gamma''_{max} \sqrt{\sum_{k=1}^{n}\left(\sum_{j=1}^{p}|w_j^{(o)}||w_{j,k}^{(h)}|\sqrt{\sum_{i=1}^{n}(w_{j,i}^{(h)})^2}\right)^2}.$$

Block 152 determines a look-up table mapping φ(x) defined on the rectangle $\tilde{R}$, with each coordinate discretized with step $\tilde{\Delta}_i$; interpolation formula is as described in appendix A.2. In block 154, for each of $\tilde{N}=\tilde{N}_1\tilde{N}_2\ldots\tilde{N}_n$ discretization points within the rectangle $\tilde{R}$ $$x(k_1, k_2, \ldots, k_n) = \begin{bmatrix} x_1^{(lo)} + k_1\tilde{\Delta}_1 \\ x_2^{(lo)} + k_2\tilde{\Delta}_2 \\ \vdots \\ x_n^{(lo)} + k_n\tilde{\Delta}_n \end{bmatrix}, 0 \leq k_i < N_i,$$

the following is determined:
the value of the look-up table mapping φ

$$v(k_1, k_2, \ldots, k_n) = \phi(x(k_1, k_2, \ldots, k_n))$$

the m-dimensional measurement vector z $$z(k_1, k_2, \ldots, k_n) = \psi(x(k_1, k_2, \ldots, k_n))$$

the value of the neural net function (assuming no measurement noise)

$$y(k_1, k_2, \ldots, k_n) = f(z(k_1, k_2, \ldots, k_n))$$

the error value $$e(k_1, k_2, \ldots, k_n) = y(k_1, k_2, \ldots, k_n) - v(k_1, k_2, \ldots, k_n)$$

and the gradient vector of the neural mapping $$f'(z(k_1, k_2, \ldots, k_n)).$$

In block 156, for each cell, the maximal mean distance and maximal mean square distance is calculated between a point and all vertices of the corresponding cell, as derived in appendix A.5

$$D_{max} = \frac{1}{2^n}\sum_{j_1=0}^{1}\sum_{j_2=0}^{1}\ldots\sum_{j_n=0}^{1}\sqrt{j_1\tilde{\Delta}_1^2 + j_2\tilde{\Delta}_2^2 + \ldots + j_n\tilde{\Delta}_n^2}$$

$$D_{max}^{(2)} = \frac{1}{2}\sum_{j=1}^{n}\tilde{\Delta}_j^2.$$

Also, in block 156, for each cell of the domain, with the "lower-left" vertex $(k_1, k_2, \ldots, k_n)$, $0 \leq k_i < \tilde{N}_i - 1$, the following is performed:

Denote:

$$f'(j_1, \ldots, j_n) = f'(z(k_1+j_1, \ldots, k_n+j_n))$$

$$\Phi(j_1, \ldots, j_n) = v(k_1+j_1, \ldots, k_n+j_n)$$

$$\omega(j_1, \ldots, j_n) = z(k_1+j_1, \ldots, k_n+j_n)$$

Again Φ and ω are used for the look-up table values indexed relative to vertices of the current cell, in order to distinguish them from Φ and ψ, which denote table entries indexed relative to the whole table, and from φ and ψ, which refer to interpolated functions of the real variable.

Block 156 also calculates the mean value of the approximation error over all vertices of the current cell $$\bar{e}(k_1, k_2, \ldots, k_n) = \frac{1}{2^n}\sum_{j_1=0}^{1}\sum_{j_2=0}^{1}\ldots\sum_{j_n=0}^{1}e(k_1+j_1, k_2+j_2, \ldots, k_n+j_n).$$

Now, block 158 calculates, for each of the cell vertices, a gradient vector of mapping φ restricted to that cell $$\Phi'(j_1, j_2, \ldots, j_n)^T = \begin{bmatrix} \frac{1-2j_1}{\Delta_1}(\tilde{\Phi}(1-j_1, j_2, \ldots, j_n) - \tilde{\Phi}(j_1, j_2, \ldots, j_n)) \\ \frac{1-2j_2}{\Delta_2}(\tilde{\Phi}(j_1, 1-j_2, \ldots, j_n) - \tilde{\Phi}(j_1, j_2, \ldots, j_n)) \\ \ldots \\ \frac{1-2j_n}{\Delta_n}(\tilde{\Phi}(j_1, j_2, \ldots, 1-j_n) - \tilde{\Phi}(j_1, j_2, \ldots, j_n)) \end{bmatrix}$$

and gradient vector of each measurement transformation $\psi^{(i)}$ restricted to the current cell $$\Psi'^{(i)}(j_1, j_2, \ldots, j_n)^T = \begin{bmatrix} \frac{1-2j_1}{\Delta_1}(\Psi^{(i)}(1-j_1, j_2, \ldots, j_n) - \Psi^{(i)}(j_1, j_2, \ldots, j_n)) \\ \frac{1-2j_2}{\Delta_2}(\Psi^{(i)}(j_1, 1-j_2, \ldots, j_n) - \Psi^{(i)}(j_1, j_2, \ldots, j_n)) \\ \ldots \\ \frac{1-2j_n}{\Delta_n}(\Psi^{(i)}(j_1, j_2, \ldots, 1-j_n) - \Psi^{(i)}(j_1, j_2, \ldots, j_n)) \end{bmatrix}$$

and, at each vertex of that cell forms the Jacobian matrix of $\psi$ $$\Psi'(j_1, j_2, \ldots, j_n) = \begin{bmatrix} \Psi'^{(l)}(j_1, j_2, \ldots, j_n) \\ \ldots \\ \Psi'^{(m)}(j_1, j_2, \ldots, j_n) \end{bmatrix}$$

and calculates gradient of the error mapping $$e'(j_1, j_2, \ldots, j_n) = f'(j_1, j_2, \ldots, j_n)\omega'(j_1, j_2, \ldots, j_n)^T - \Phi'(j_1, j_2, \ldots, j_n).$$

Also, in block 158 is calculated bounding constant $K'_\phi$ for the current cell, as derived in appendix A.2 by calculating at each vertex, the Hessian matrix $\Phi''(j_1, j_2, \ldots, j_n)$ with element 1, m defined as:

$$\Phi''_{l,m}(j_1, j_2, \ldots, j_n) = \frac{1-2j_m}{\Delta_m}(\Phi'_l(j_1, \ldots, 1-j_m, \ldots, j_n) - \Phi'_l(j_1, \ldots, j_n))$$

and finding an upper bound for the Hessian matrix over all vertices $$\Phi''_{l,m\max} = \max_{\substack{j_1=0,1 \\ \vdots \\ j_n=0,1}} |\Phi''_{l,m}(j_1, j_2, \ldots, j_n)|$$

then, calculating the desired Lipschitz constant for function $\phi$ restricted to the curent cell $$K'_\varphi = \sqrt{\sum_{l=1}^{n}\sum_{m=1}^{n}(\Phi''_{l,m\max})^2}.$$

Also, block 158 calculates for each cell Lipschitz constants $K_\psi'$ and $K_F'$ by the following method:

for each measurement transformation $\psi^{(i)}$, i=1, ..., m, calculate Lipschitz constant $K_{\psi i}$ as derived in appendix A.2:

calculate maximal absolute values for all components of gradient $\psi'^{(i)}$ over all cell vertices $$\Psi'^{(i)}_{l\max} = \max_{\substack{j_1=0,1 \\ j_2=0,1 \\ \vdots \\ j_n=0,1}} |\Psi'^{(i)}_l(j_1, j_2, \ldots, j_n)|,$$

then, compute a bounding constant for the transformation $\psi^{(i)}$ $$K_{\psi 1} = \sqrt{\sum_{i=1}^{m}(\Psi'^{(i)}_{l\max})^2},$$

calculate Lipschitz constant $K_\psi$ for the m-dimensional mapping $\psi$, as derived in appendix A.3

$$K_\psi = \sqrt{\sum_{i=1}^{m} K_{\psi i}^2},$$

for each measurement transformation $\psi^{(i)}$, i=1, ..., m, calculate Lipschitz constant $K'_{\psi i}$ as derived in appendix A.2:

at each vertex calculate Hessian matrix $\omega''^{(i)}$, defined by $$\Psi''^{(i)}_{l,m}(j_1, j_2, \ldots, j_n) = \frac{1-2j_m}{\Delta_m}(\Psi'^{(i)}_l(j_1, \ldots, 1-j_m, \ldots, j_n) - \Psi'^{(i)}_l(j_1, \ldots, j_n))$$

next, find an upper bound for this Hessian matrix over all vertices $$\Psi''^{(i)}_{l,m\max} = \max_{\substack{j_1=0,1 \\ \vdots \\ j_n=0,1}} |\Psi''^{(i)}_{l,m}(j_1, j_2, \ldots, j_n)|$$

calculate the desired constant for the transformation $\psi^{(i)}$ $$K'_{\psi i} = \sqrt{\sum_{l=1}^{n}\sum_{m=1}^{n}(\Psi''^{(i)}_{l,m\max})^2}$$

then, calculate Lipschitz constant $K'_\psi$ for the m-dimensional mapping $\psi$ restricted to the current cell, as derived in appendix A.3

$$K'_\psi = \sqrt{\sum_{i=1}^{m} K'^2_{\psi i}},$$

calculate constant $K'_F$ for the composite maping $F(x)=f(\psi(x))$ restricted to the current cell, as derived in appendix A.4

$$K'_F = K_f K'_\psi + K'_f K_\psi^2.$$

Next, at each vertex of a cell, block 160 finds the transformed error gradient, as discussed in appendix A.7

$$h(j_1, j_2, \ldots, j_n) = e'(j_1, j_2, \ldots, j_n)\begin{bmatrix} 1-2j_1 & 0 & \cdots & 0 \\ 0 & 1-2j_2 & \cdots & 0 \\ \vdots & \vdots & \ddots & \vdots \\ 0 & 0 & \cdots & 1-2j_n \end{bmatrix}$$

and calculates the maximal and minimal values of a directional derivative into the cell $$g_{\max}(j_1, \ldots, j_n) = \min\left(0, \max_i h_i(j_1, \ldots, j_n)\right) + \sqrt{\sum_{i=1}^{n}\max(0, h_i(j_1, \ldots, j_n))^2}$$

$$g_{\min}(j_1, \ldots, j_n) = \max\left(0, \min_i h_i(j_1, \ldots, j_n)\right) - \sqrt{\sum_{i=1}^{n}\min(0, h_i(j_1, \ldots, j_n))^2}$$

Then, block 162 finds bounds for the directional derivatives within the cell as follows:

$$G_{\max} = \max_{\substack{j_1=0,1 \\ \vdots \\ j_n=0,1}} g_{\max}(j_1, \ldots, j_n)$$

-continued $$G_{min} = \min_{\substack{j_1=0.1 \\ \vdots \\ j_n=0.1}} g_{min}(j_1, \ldots, j_n).$$

Block 164 determines the desired bounds for error value within each current cell (with noiseless measurements), as derived in appendix A.7

$$M_{lo}^{error}(k_1, \ldots, k_n) = \bar{e}(k_1, \ldots, k_n) + G_{min}D_{max} - 1/2(K'_1 + K'_\phi)D_{max}^{(2)}$$

$$M_{up}^{error}(k_1, \ldots, k_n) = \bar{e}(k_1, \ldots, k_n) + G_{max}D_{max} + 1/2(K'_F + K'_\phi)D_{max}^{(2)}.$$

Next, block 166 determines a lower error bound for the mapping functions f and φ over the entire rectangle by selecting a minimum value from the lower error bounds determined for the cells over the entire domain and subtracting an error component related to measurement noise in accordance with the following expression:

$$M_{lo}^{error} = \min_{k_1, k_2, \ldots, k_n} M_{lo}^{error}(k_1, k_2, \ldots, k_n) - K_f \zeta_{max},$$

and, block 168 determines an upper error bound for the mapping functions f and φ over the entire rectangle by selecting a maximum value from the upper error bounds determined for the cells over the entire domain and adding an error component related to measurement noise in accordance with the following expression:

$$M_{up}^{error} = \max_{k_1, k_2, \ldots, k_n} M_{up}^{error}(k_1, k_2, \ldots, k_n) + K_f \zeta_{max}.$$

Thus, according to block 170, if the upper and lower error bounds of the domain R can be determined, then φ(x)−f(ψ(x)+ζ) is error bounded for all x∈R.

The procedures outlined for the preferred software embodiments in this application may be quite computationally expensive in a digital computer if dimensionality of input is large. However, it is understood that by intelligent re-use of intermediate results (for example some of the gradient and directional derivative values) for neighboring rectangular cells, and by early stopping of some loops it is possible to make them much more computationally efficient. However, for the sake of simplicity, the more straightforward formulations were presented. In addition, in the presented embodiments it was assumed that standard arithmetic software operations are absolutely precise. In reality, numerical accuracy of all software calculations should also be addressed for certification purposes. However, this is a technical detail largely dependent on how the actual certification process proceeds. Since most software calculations described here consists of simple additions, subtractions and multiplications, and all matrices are of moderate sizes, it is not expected that numerical accuracy of the verification procedure is going to be a major issue.

Appendix A: Mathematical Derivations

A.1 Growth Bounds for a Neural Net Mapping

In this section we find bounds on growth of a neural net mapping $f$ and its gradient $f'$. Specifically, we look for Lipschitz constant for $f$ and $f'$, that is for constants $K_f$ and $K'_f$, such that for any two input vectors $v \in \Re^n, z \in \Re^n$ the following inequalities will be satisfied:

$$|f(v)-f(z)| \leq K_f \|v-z\|$$

$$\|f'(v)^T - f'(z)^T\| \leq K'_f \|v-z\|$$

We assume a neural net with one hidden layer, given by the formula:

$$f(x) = W^{(o)}\Gamma(W^{(h)}x + b^{(h)}) + b^{(o)}$$

First, we calculate the maximal slope of the neuron activation function γ

$$\gamma'_{max} = \max_{x \in \mathcal{R}} |\gamma'(x)|$$

This value is easily found analytically. For the two most popular choices of γ—the logistic function and the hyperbolic tangent—we have $\gamma'_{max}=¼$, and $\gamma'_{max}=1$, respectively. By the definition of $\gamma'_{max}$, the neuron activation function γ satisfies $$|\gamma(v)-\gamma(z)| \leq \gamma'_{max}|v-z|$$

Because of diagonal nature of Γ, the following inequality is satisfied $$\|\Gamma(v)-\Gamma(z)\| \leq \gamma'_{max}\|v-z\|$$

Next, we deal with matrix transformations. For any matrix A, and for any two vectors v, z of appropriate dimensions, it holds that $$\|Av-Az\| \leq \|A\|\|v-z\|$$

where the matrix norm is the induced $L_2$ norm (spectral norm). When we apply the above inequalities to the definition of the neural net mapping, we obtain the following upper bound $$|f(v)-f(z)| \leq \gamma'_{max}\|W^{(o)}\|\|W^{(h)}\|\|v-z\|$$

To obtain bounds for growth of the gradient vector, we follow a similar procedure. The (row) gradient vector of f is $$f'(x) = W^{(o)}\Gamma'(W^{(h)}x+b^{(h)})W^{(h)}$$

Because Γ is diagonal, to bound growth of Γ' we only need to find maximal value of the second derivative of the neuron activation function $$\gamma''_{max} = \max_{x \in \mathcal{R}} |\gamma''(x)|$$

In the standard cases of logistic function and hyperbolic tangent, this number is readily found as $\gamma''_{max} = \sqrt{3}/18$, and $\gamma''_{max} = 4\sqrt{3}/9$, respectively. The i-th diagonal element of the Jacobian matrix Γ' satisfies $$|\Gamma'_{i,j}(v) - \Gamma'_{i,j}(z)| \leq \gamma''_{max}|v_{i,j} - z_{i,j}|$$

which leads to the folowing condition for the norm of the Jacobian $$\|\Gamma'(v) - \Gamma'(z)\| \leq \gamma''_{max}\|v-z\|$$

When we combine the above inequality with formula for f',
we obtain $$\|f'(v)^T - f'(z)^T\| \leq \gamma''_{max} \|W^{(h)}\|^2 \|W^{(o)}\| \|v-z\|$$

Now, we are able to calculate the required Lipschitz constants $K_f$ and $K'_f$ $$K_f = \gamma'_{max} \|W^{(o)}\| \|W^{(h)}\|$$

$$K'_f = \gamma''_{max} \|W^{(o)}\| \|W^{(h)}\|^2$$

The above formulae require calculation of norms for output and hidden weight matrices $W^{(o)}$ and $W^{(h)}$. The output weight matrix is actually a row vector, so its norm can be calculated directly from values of connection weights $$\|W^{(o)}\| = \sqrt{\sum_{i=1}^{p} (w_i^{(o)})^2}$$

A more difficult situation arises with hidden weight matrix. A general formula for the spectral norm is $$\|A\| = \sqrt{\max_i \lambda_i(A^T A)}$$

where $\lambda_i$ stands for i-th eigenvalue of a matrix. This calculation is usually a part of standard numerical algebra packages, including Matlab. However, it is not clear how utilization of such a routine would influence the validation procedure from the certification point of view. Quite likely, an iterative numerical procedure to calculate the matrix norm would have to be certified itself. If such certification is possible, or not at all required, then the final formulae for the bounding constants would be:

$$K_f = \gamma'_{max} \sqrt{\sum_{i=1}^{p} (w_i^{(o)})^2} \sqrt{\max_i \lambda_i(W^{(h)T} W^{(h)})}$$

$$K'_f = \gamma''_{max} \sqrt{\sum_{i=1}^{p} (w_i^{(o)})^2} \max_i \lambda_i(W^{(h)T} W^{(h)})$$

If direct matrix norm calculation is not admissible, we may approximate it using an inequality $$\|W^{(h)}\| \leq \|W^{(h)}\|_F = \sqrt{\sum_{i=1}^{p} \sum_{j=1}^{n} (w_{i,j}^{(h)})^2}$$

where the quantity $\|W^{(h)}\|_F$ is known as Frobenius matrix norm (which is not an induced matrix norm). This formula is much simpler than the eigenvalue calculation, and can be done using elementary arithmetic operations. A disadvantage is that it may be very conservative, and in the worst case may overestimate the actual norm $\sqrt{p}$ times. With the Frobenius norm approximation, the required Lipschitz constants are:

$$K_f = \gamma'_{max} \sqrt{\sum_{i=1}^{p} (w_i^{(o)})^2} \sqrt{\sum_{i=1}^{p} \sum_{j=1}^{n} (w_{i,j}^{(h)})^2}$$

$$K'_f = \gamma''_{max} \sqrt{\sum_{i=1}^{p} (w_i^{(o)})^2} \sum_{i=1}^{p} \sum_{j=1}^{n} (w_{i,j}^{(h)})^2$$

The above formulae may be very conservative, even if matrix norm is calculated exactly. An improvement may be achieved if specific form of the neural net mapping is exploited more efficiently. First, we write the increment in the neural net output as:

$$|f(v) - f(z)| = \left| \sum_{k=1}^{p} w_k^{(o)} \left( \gamma \left( \sum_{i=1}^{n} w_{k,i}^{(h)} v_i + b_k^{(h)} \right) - \gamma \left( \sum_{i=1}^{n} w_{k,i}^{(h)} z_i + b_k^{(h)} \right) \right) \right|$$

Next, we use $\gamma'_{max}$ to bound the increment of each neuron's output. This leads to:

$$|f(v) - f(z)| \leq \sum_{k=1}^{p} |w_k^{(o)}| \gamma'_{max} \left| \sum_{i=1}^{n} w_{k,i}^{(h)} v_i - \sum_{i=1}^{n} w_{k,i}^{(h)} z_i \right|$$

$$|f(v) - f(z)| \leq \gamma'_{max} \sum_{k=1}^{p} |w_k^{(o)}| \sqrt{\sum_{i=1}^{n} (w_{k,i}^{(h)})^2} \|v - z\|$$

For the gradient increments, we proceed similarly. We will derive a bound for change in the k-th coordinate of the gradient vector $$|f'_k(v) - f'_k(z)| = \left| \sum_{j=1}^{p} w_j^{(o)} \left( \gamma' \left( \sum_{i=1}^{n} w_{j,i}^{(h)} v_i + b_j^{(h)} \right) - \gamma' \left( \sum_{i=1}^{n} w_{j,i}^{(h)} z_i + b_i^{(h)} \right) \right) w_{j,k}^{(h)} \right|$$

Next, we use $\gamma''_{max}$ to bound the increment in the first derivative of each neuron's output:

$$|f'_k(v) - f'_k(z)| \leq \gamma''_{max} \sum_{j=1}^{p} |w_j^{(o)}| |w_{j,k}^{(h)}| \left| \sum_{i=1}^{n} w_{j,i}^{(h)} (v_i - z_i) \right|$$

$$|f'_k(v) - f'_k(z)| \leq \gamma''_{max} \sum_{j=1}^{p} |w_j^{(o)}| |w_{j,k}^{(h)}| \sqrt{\sum_{i=1}^{n} (w_{j,i}^{(h)})^2} \|v - z\|$$

This gives a bound for the norm of the gradient vector increment:

$$\|f'(v) - f'(z)\| \leq \gamma''_{max} \sqrt{\sum_{k=1}^{n} \left( \sum_{j=1}^{p} |w_j^{(o)}| |w_{j,k}^{(h)}| \sqrt{\sum_{i=1}^{n} (w_{j,i}^{(h)})^2} \right)^2} \|v - z\|$$

From these derivations, we get the following Lipschitz constants $K_f$ and $K'_f$:

$$K_f = \gamma'_{\max} \sum_{k=1}^{p} |w_k^{(o)}| \sqrt{\sum_{i=1}^{n} (w_{k,i}^{(h)})^2}$$

$$K'_f = \gamma''_{\max} \sqrt{\sum_{k=1}^{n} \left( \sum_{j=1}^{p} |w_j^{(o)}| |w_{j,k}^{(h)}| \sqrt{\sum_{i=1}^{n} (w_{j,i}^{(h)})^2} \right)^2}$$

In computer simulation trials, these expressions usually give better (lower) values for $K_f$ and $K'_f$ than the previous expressions. However, all the formulae derived in this section are only conservative approximations for the optimal values. For a specific pair of weight matrices $W^{(o)}$ and $W^{(h)}$ the best avenue is to evaluate all possible variants and take the lowest values for $K_f$ and $K'_f$.

The derived formulae are valid globally—everywhere in the input space. It may be advantageous to calculate local bounds valid only in a small rectangular cell of the discretization grid. The key observation is that if each input coordinate is restricted to a small interval, then majority of neurons do not attain the maximal values of first and second derivative. Given a particular rectangle, it is easy to calculate for the k-th neuron the upper bounds $\gamma'_{k\,max}$ and $\gamma''_{k\,max}$ for the absolute values of first and second derivative of that neuron's output. That is, we select values such that for any point x within the given rectangle, first and second derivative of the activation function of the k-th neuron should satisfy $$\left| \gamma' \left( \sum_{i=1}^{n} w_{k,i}^{(h)} x_i + b_k^{(h)} \right) \right| \leq \gamma'_{kmax}$$

$$\left| \gamma'' \left( \sum_{i=1}^{n} w_{k,i}^{(h)} x_i + b_k^{(h)} \right) \right| \leq \gamma''_{kmax}$$

The specific mechanics of finding such numbers $\gamma'_{k\,max}$ and $\gamma''_{k\,max}$ depend on the particular form of the sigmoidal activation function $\gamma$—the task is rather easy and details are omitted here.

Once the constants $\gamma'_{k\,max}$ and $\gamma''_{k\,max}$ are found for each of the p neurons, then the Lipschitz constants $K_f$ and $K'_f$ are found as:

$$K_f = \sum_{k=1}^{p} \gamma'_{kmax} |w_k^{(o)}| \sqrt{\sum_{i=1}^{n} (w_{k,i}^{(h)})^2}$$

$$K'_f = \sqrt{\sum_{k=1}^{n} \left( \sum_{j=1}^{p} \gamma''_{jmax} |w_j^{(o)}| |w_{j,k}^{(h)}| \sqrt{\sum_{i=1}^{n} (w_{j,i}^{(h)})^2} \right)^2}$$

These constant will always be better (lower) than the global ones, since obviously $\gamma'_{k\,max} \leq \gamma'_{max}$ and $\gamma''_{k\,max} \leq \gamma''_{max}$. However, they are valid only locally, and have to be recalculated for each cell of the rectangular discretization grid.

A.2 Growth Bounds for a Single-valued Look-up Table Mapping

We assume a look-up table mapping defined on an n-dimensional rectangle $R=(x^{(lo)}, x^{(up)})$, with each coordinate discretized into $N_i-1$ intervals of length $\Delta_i$. The table consists of $N=N_1 N_2 \ldots N_n$ entries $\Phi(k_1, k_2, \ldots, k_n)$, $0 \leq k_i < N_i-1$. Consider an input argument x within a cell $(k_1, k_2, \ldots, k_n)$, that is such that its coordinates $x_i$ satisfy $$x_i^{(lo)} + k_i \Delta_i \leq x_i \leq x_i^{(lo)} + (k+1)\Delta_i$$

The value of the look-up table mapping $\phi(x)$ is defined through n-linear interpolation of $2^n$ table entries corresponding to the vertices of the cell $$\varphi(x) = \frac{1}{\prod_{i=1}^{n} \Delta_i} \sum_{j_1=0}^{1} \sum_{j_2=0}^{1} \ldots \sum_{j_n=0}^{1} \Phi(k_1+j_1, \ldots, k_n+j_n) \left( \prod_{i=1}^{n} \delta_i^{j_i} \right)$$

$$\delta_i^0 = x_i - (x_i^{(lo)} + k_i \Delta_i)$$

$$\delta_i^1 = (x_i^{(lo)} + (k_i+1)\Delta_i) - x_i$$

Note that throughout this application we use capital $\Phi$ for table entries indexed by integers, and lower-case $\phi$ for the interpolated function of a real argument Calculation of a Lipschitz constant for this function is easy, if we use the fact that within each cell the function is linear along any direction parallel (or perpendicular) to all axes. Thus, its gradient within the cell is bounded by the gradient values attained at the vertices (more precisely, by the limits attained by the gradient at the vertices, since the interpolation formula need not be differentiable at the boundary of the cell). These in turn, are simply the forward differences. The calculation is as follows. For each table vertex $(k_1, k_2, \ldots, k_n)$ $k_i=0, \ldots, N_i-2$ we find the gradient vector $$\Phi'(k_1, k_2, \ldots, k_n)^T = \begin{bmatrix} \frac{\Phi(k_1+1, k_2, \ldots, k_n) - \Phi(k_1, k_2, \ldots, k_n)}{\Delta_1} \\ \frac{\Phi(k_1, k_2+1, \ldots, k_n) - \Phi(k_1, k_2, \ldots, k_n)}{\Delta_2} \\ \vdots \\ \frac{\Phi(k_1, k_2, \ldots, k_n+1) - \Phi(k_1, k_2, \ldots, k_n)}{\Delta_n} \end{bmatrix}$$

Then, for each coordinate we find the maximal absolute value over all the vertices $$\Phi'_{i\max} = \max_{k_1, \ldots, k_n} |(\Phi'_i(k_1, k_2, \ldots, k_n))^T| =$$

$$\max_{k_1, \ldots, k_n} \frac{|\Phi(k_1, \ldots, k_i+1, \ldots, k_n) - \Phi(k_1, k_2, \ldots, k_n)|}{\Delta_i}$$

Now we obtain the Lipschitz constant $$K_\varphi = \sqrt{\sum_{i=1}^{n} (\Phi'_{i\max})^2}$$

This is a global constant, bounding growth of the function throughout the entire range of the look-up table. If we are interested in local analysis within each cell separately, we may obtain a collection of better (smaller) bounding constants.

Let us fix a cell with the "lower-left" vertex $(k_1, k_2, \ldots, k_n)$, $0 \leq k_i < N_i-1$. We will consider gradient of p restricted to this cell, evaluated at its vertices. Denote the $2^n$ values of function $\phi$ at the vertices as $\Phi(j_1, j_2, \ldots, j_n)$, $j_i=0, 1$.

$$\Phi(j_1, j_2, \ldots, j_n) = \phi(x(k_1+j_1, k_2+j_2, \ldots, k_n+j_n))$$

Note that we use $\Phi$ for the values indexed relative to the current cell, in order to distinguish them from globally indexed table entries $\Phi$. Let the gradient of $\phi$ restricted to the cell, evaluated at a vertex, be $$\Phi'(j_1, j_2, \ldots, j_n) = \phi'(x(k_1+j_1, k_2+j_2, \ldots, k_n+j_n))$$

Because of the multi-linear interpolation, $\phi$ is linear along lines parallel or perpendicular to all axes. Hence, the components of the gradient vector are obtained as slopes of $\phi$ along edges of the cell $$\Phi'(j_1, j_2, \ldots, j_n)^T = \begin{bmatrix} \frac{1-2j_1}{\Delta_1}(\Phi(1-j_1, j_2, \ldots, j_n) - \Phi(j_1, j_2, \ldots, j_n)) \\ \frac{1-2j_2}{\Delta_2}(\Phi(j_1, 1-j_2, \ldots, j_n) - \Phi(j_1, j_2, \ldots, j_n)) \\ \ldots \\ \frac{1-2j_n}{\Delta_n}(\Phi(j_1, j_2, \ldots, 1-j_n) - \Phi(j_1, j_2, \ldots, j_n)) \end{bmatrix}$$

Extreme values of gradient components are those attained at the cell vertices $$\Phi'_{i\,max} = \max_{j_1, j_2, \ldots, j_n = 0,1} |\Phi'_i(j_1, j_2, \ldots, j_n)|$$

Now a bounding constant may be calculated, which limits growth of function $\phi$ locally within the cell in question:

$$K_\varphi(k_1, k_2, \ldots, k_n) = \sqrt{\sum_{i=1}^{n} (\Phi'_{i\,max})^2}$$

Growth of the gradient of the look-up table cannot be analyzed globally, but only within each cell, where the function is differentiable. Let us again fix a cell with the "lower-left" vertex $(k_1, k_2, \ldots, k_n)$, and as above let $\Phi'(j_1, j_2, \ldots, j_n)$ denote gradient at $2^n$ vertices. To bound the rate of change of the gradient vector within the cell we notice that again the gradient is linear along any straight line parallel or perpendicular to all axes. Therefore it is enough to calculate the Hessian matrix $\Phi$ only at the vertices, using differences of elements of $\Phi'$ at the adjacent vertices $$\Phi''_{l,m}(j_1, j_2, \ldots, j_n) =$$
$$\frac{1-2j_m}{\Delta_m}(\Phi'_l(j_1, \ldots, 1-j_m, \ldots, j_n) - \Phi'_l(j_1, \ldots, j_n))$$

Note that the diagonal entries of each Hessian matrix are all zero, and that they are symmetrical, so it is enough to calculate only upper (or lower) triangular portions. Now we take the maximal absolute value of each entry of Hessian $\Phi$ over all vertices of the cell, to obtain the bounds on Hessian matrix entries over the whole cell.

$$\Phi''_{l,m\,max} = \max_{j_1, j_2, \ldots, j_n = 0,1} |\Phi''_{l,m}(j_1, j_2, \ldots, j_n)|$$

The above formula may be simplified, if we note that the values of the second order derivative with respect to coordinates $l$ and $m$ are identical on each four vertices of each rectangular wall, on which the remaining coordinates are constant. That is, the value of $\Phi''_{l,m}$ is the same for all four possible combinations of $j_l$ and $j_m$. Therefore we may seek maximum only with respect to other indices, fixing $j_l = j_m = 0$.

$$\Phi''_{l,m\,max} = \max_{\substack{j_1 = 0,1 \\ \ldots \\ j_n = 0,1}} \left| \Phi''_{l,m}\left(j_1, \ldots, j_{l-1}, \underset{l\text{-th index}}{0}, j_{l+1}, \ldots, j_{m-1}, \underset{m\text{-th index}}{0}, j_{m+1}, \ldots, j_n\right) \right|$$

Now we use the Frobenius norm estimate for matrix norm from a previous section, which leads us to the the following Lipschitz constant (valid within the particular cell)

$$K'_\varphi(k_1, k_2, \ldots, k_n) = \sqrt{\sum_{l=1}^{n} \sum_{m=1}^{n} (\Phi''_{l,m\,max})^2}$$

The above calculation of Lipschitz constants guarantees that for any two input values $v, z$, within the same cell of the look-up table, it holds that $$|\phi(v) - \phi(z)| \leq K_\phi(k_1, k_2, \ldots, k_n) \|v - z\|$$

$$\|\phi'(v) - \phi'(z)\| \leq K'_\phi(k_1, k_2, \ldots, k_n) \|v - z\|$$

A.3 Growth Bounds for a Multiple-valued Look-up Table Mapping

Assume that we have an m-valued look-up table mapping $\psi$, or, equivalently, m single-valued look-up table functions (i), all with the same discretization of the input space. For each look-up table mapping (i) we may calculate appropriate Lipschitz constants $K_{\psi i}$ and $K'_{\psi i}$ using the formulae derived in section A2. For each $\psi_i$ we have that $$|\psi_i(v) - \psi_i(z)| \leq K_{\psi i} \|v - z\|$$

From the definition of the vector norm, we obtain $$\|\psi(v) - \psi(z)\| = \sqrt{\sum_{i=1}^{m} |\psi_i(v) - \psi_i(z)|^2}$$

$$\leq \sqrt{\sum_{i=1}^{m} K_{\psi i}^2 \|v - z\|^2}$$

$$= \sqrt{\sum_{i=1}^{m} K_{\psi i}^2} \, \|v - z\|$$

From this, we obtain the desired bounding constant $$K_\psi = \sqrt{\sum_{i=1}^{m} K_{\psi i}^2}$$

For the Jacobian matrix of $\psi$ we proceed similarly. For gradient of each coordinate mapping we have $$\|\psi'_i(v) - \psi'_i(z)\| \leq K'_{\psi,i}\|v - z\|$$

For bounding the spectral norm of the Jacobian matrix we use the Frobenius norm approximation $$\|\psi'(x)\| \leq \sqrt{\sum_{i=1}^{m} \|\psi'_i(x)\|^2}$$

This leads us to the following bound on growth of the Jacobian matrix $$\|\psi'(v) - \psi'(z)\| = \sqrt{\sum_{i=1}^{m} \|\psi'_i(v) - \psi'_i(z)\|^2}$$

$$\leq \sqrt{\sum_{i=1}^{m} (K'_{\psi i}\|v - z\|)^2}$$

$$= \sqrt{\sum_{i=1}^{m} K'^2_{\psi i}} \|v - z\|$$

The final value of the bounding constant is $$\boxed{K'_\psi = \sqrt{\sum_{i=1}^{m} K'^2_{\psi i}}}$$

A.4 Growth Bounds for a Composition of Two Mappings

Let $\psi$ be an m-valued maping defined by m look-up tables, as discussed in the previous section. Let f be a neural net mapping with m inputs and a single output. We define a composition of the two mappings $$F(x) = f(\psi(x))$$

We desire to find bounding constants $K_F$, and $K'_F$, such that for any two input vectors v and z, within the domain of the look-up table $\psi$, we have $$|F(v) - F(z)| \leq K_F\|v - z\|$$

$$\|F'(v)^T - F'(z)^T\| \leq K'_F\|v - z\|$$

As before, the second inequality will be considered valid only within each elementary cell defined by discretization of the input space, due to the fact that a look-up table mapping (as defined here) generally is not differentiable at cell boundaries.

Using the formulae derived in the preceding sections we first find bounding constants $K_f$, $K'_f$, $K_\psi$, and $K'_\psi$, for the mappings f and $\psi$. Next, we write $$\|F(v) - F(z)\| = \|f(\psi(v)) - f(\psi(z))\|$$
$$\leq K_F\|\psi(v) - \psi(z)\|$$
$$\leq K_F K_\psi\|v - z\|$$

From this we have an expression for constant $K_F$ $$\boxed{K_F = K_f K_\psi}$$

To find the bounding constant $K'_F$ we simply use the chain rule of differentiation. Let us denote the output values of $\psi$ evaluated at points v and z as $\eta$ and $\zeta$:

$$\eta = \psi(v), \quad \zeta = \psi(z)$$

Now we express the difference between Jacobian matrices $F'(v)$ and $F'(z)$ $$F'(v) - F'(z) = f'(\eta)\psi'(v) - f'(\zeta)\psi'(z)$$
$$= f'(\eta)\psi'(v) - f'(\zeta)\psi'(z) + f'(\eta)\psi'(z) - f'(\eta)\psi'(z)$$
$$= f'(\eta)(\psi'(v) - \psi'(z)) + (f'(\eta) - f'(\zeta))\psi'(z)$$

Using definitions of $K_f$, $K'_f$, $K_\psi$, and $K'_\psi$, and the fact that $\|f'\| \leq K_f$ and $\|\psi'\| \leq K_\psi$, we obtain the following sequence of inequalities $$\|F'(v) - F'(z)\| \leq \|f'(\eta)\|\|\psi'(v) - \psi'(z)\| + \|f'(\eta) - f'(\zeta)\|\|\psi'(z)\|$$
$$\leq K'_f K'_\psi\|v - z\| + K'_f\|\eta - \zeta\|K'_\psi$$
$$\leq K'_f K'_\psi\|v - z\| + K'_f K_\psi\|v - z\|K'_\psi$$
$$\leq (K'_f K'_\psi + K'_f K_\psi K'_\psi)\|v - z\|$$

Consequently, the formula for $K'_F$ is $$\boxed{K'_F = K'_f K'_\psi + K'_f K_\psi K'_\psi}$$

A.5 Distance to Vertices of a Rectangle

We are interested in analyzing mean distance of a point within an n-dimensional rectangular cell of a look-up table. Assume that lengths of cell sides (discretization steps for each dimension) are $\Delta_i$. With no loss of genarality, we may shift the coordinate system so that its origin coincides with the "lower-left" vertex of the cell. Thus, any point x within the cell satisfies $$0 \leq x_i \leq \Delta_i, \; i = 1, \ldots, n$$

Coordinates of the cell vertices are given by $$(i_1\Delta_1, i_2\Delta_2, \ldots, i_n\Delta_n), \; i_j = 0, 1$$

Distance of x from a particular vertex is $$D(\tilde{x}, i_1, \ldots, i_n) = \sqrt{\sum_{j=1}^{n} (\tilde{x}_j - i_j\Delta_j)^2}$$

Mean distance of x from all vertices is then $$D(\tilde{x}) = \frac{1}{2^n} \sum_{i_1=0}^{1} \sum_{i_2=0}^{1} \cdots \sum_{i_n=0}^{1} \sqrt{\sum_{j=1}^{n} (\tilde{x}_j - i_j\Delta_j)^2}$$

We want to find the maximum of this function over all points $\tilde{x}$ within the cell. It is easy to show (details are omitted here) that function D is strictly convex within the cell. Convexity also holds if we restrict the function to any m-dimensional subspace, with n-m coordinates fixed at their maximal or minimal values. It follows that any maximum of the function must be at a vertex of the cell. Thus, if we substitute coordinates of $2^n$ vertices as $\tilde{x}$ into formula for D, we obtain $2^n$ candidates for the maximal value of D $$D_{\max}(k_1, k_2, \ldots, k_n) = \frac{1}{2^n} \sum_{i_1=0}^{1} \sum_{i_2=0}^{1} \cdots \sum_{i_n=0}^{1} \sqrt{\sum_{j=1}^{n} (k_j - i_j)^2 \Delta_j^2}$$

Upon closer inspection, we find that this expression has the same value regardless of the particular vertex $(k_1, k_2, \ldots, k_n)$. Indeed, terms $(k_j-i_j)^2$ take binary values, and there are only $2^n$ possible arrangements of these n terms in the summation under the square root. For any combination of binary indices $(k_1, k_2, \ldots, k_n)$, all those possible arrangements appear in the formula. It follows that that the value does not depend on $(k_1, k_2, \ldots, k_n)$, and we can use any vertex to find the maxum. For simplicity, we take vertex $(0, 0, \ldots, 0)$ and calculate $$D_{\max} = \frac{1}{2^n} \sum_{i_1=0}^{1} \sum_{i_2=0}^{1} \cdots \sum_{i_n=0}^{1} \sqrt{\sum_{j=1}^{n} i_j \Delta_j^2}$$

This number is such that for any point $\tilde{x}$ within the rectangle it bounds from above the mean distance D $$\frac{1}{2^n} \sum_{i_1=0}^{1} \sum_{i_2=0}^{1} \cdots \sum_{i_n=0}^{1} D(\tilde{x}, i_1, \ldots, i_n) \le D_{\max}$$

Next we want to bound the mean square distance to the vertices. That is, we look for the maximal possible value of the following expression $$D^{(2)}(\tilde{x}) = \frac{1}{2^n} \sum_{i_1=0}^{1} \cdots \sum_{i_n=0}^{1} D^2(\tilde{x}, i_1, \ldots, i_n) = \frac{1}{2^n} \sum_{i_1=0}^{1} \cdots \sum_{i_n=0}^{1} \sum_{j=1}^{n} (\tilde{x}_j - i_j \Delta_j)^2$$

Convexity of this function is obvious, and applying the same reasoning as before, we can establish that the maximum within the cell is achieved at vertex $(0,0,\ldots,0)$, and the maximum value is $$D_{\max}^{(2)} = \frac{1}{2^n} \sum_{i_1=0}^{1} \sum_{i_2=0}^{1} \cdots \sum_{i_n=0}^{1} \sum_{j=1}^{n} i_j \Delta_j^2$$

This formula can be further simplified, if we notice that each term $\Delta_j^2$ appears in the summation exactly $2^{n-1}$ times. Therefore, we obtain $$D_{\max}^{(2)} = \frac{1}{2} \sum_{j=1}^{n} \Delta_j^2$$

This number is such that for any point x within the rectangle it bounds from above the mean square distance from the vertices $$\frac{1}{2^n} \sum_{i_1=0}^{1} \sum_{i_2=0}^{1} \cdots \sum_{i_n=0}^{1} D^2(\tilde{x}, i_1, \ldots, i_n) \le D_{\max}^{(2)}$$

A.6 Bounds for Growth within a Rectangle—First Order Approximation

In this section we derive a first version of a bound for values of a function within a rectangular cell, given its values at $2^n$ vertices. Consider a cell with "lower-left" vertex $(k_1, k_2, \ldots, k_n)$, such that its all vertices are $(k_1+j_1, k_2+j_2, \ldots, k_n+j_n)$, $j_i=0,1$. Any point $\tilde{x}$ within this rectangle satisfies $$x_i^{(lo)} + k_i \Delta_i \le \tilde{x}_i \le x_i^{(lo)} + (k_i+1)\Delta_i$$

For this particular cell, denote coordinates of the vertices and values of the function $x(j_1, j_2, \ldots, j_n)$ and $y(j_1, j_2, \ldots, j_n)$ $$x(j_1, j_2, \ldots, j_n) = \begin{bmatrix} x_1^{(lo)} + (k_1 + j_1)\Delta_1 \\ x_2^{(lo)} + (k_2 + j_2)\Delta_2 \\ \vdots \\ x_n^{(lo)} + (k_n + j_n)\Delta_n \end{bmatrix}$$

$$y(j_1, j_2, \ldots, j_n) = f(x(j_1, j_2, \ldots, j_n))$$

Let $\tilde{x}$ be an arbitrary point within the rectangular cell. Then, we can write the following $2^n$ inequalities for deviation of $f(\tilde{x})$ from the vertex values $$|f(\tilde{x}) - y(j_1, \ldots, j_n)| \le K_f D(\tilde{x}, j_1, \ldots, j_n)$$

where $K_f$ is a Lipschitz constant, and $D(\tilde{x}, j_1, \ldots, j_n)$ is the distance of point $\tilde{x}$ from a vertex $(j_1, \ldots, j_n)$, as discussed in previous sections. Another form of the above is $$y(j_1, \ldots, j_n) - K_f D(x, j_1, \ldots, j_n) \le f(x) \le y(j_1, \ldots, j_n) + K_f D(x, j_1, \ldots, j_n)$$

We add the $2^n$ inequalities to obtain $$\sum_{j_1, \ldots, j_n} (y(j_1, \ldots, j_n) - K_f D(\tilde{x}, j_1, \ldots, j_n)) \le$$

-continued $$2^n f(\tilde{x}) \leq \sum_{j_1,\ldots,j_n} (y(j_1, \ldots, j_n) + K_f D(\tilde{x}, j_1, \ldots, j_n))$$

We define the mean value of the function over all vertices of this cell $$\bar{y} = \frac{1}{2^n} \sum_{j_1=0}^{1} \sum_{j_2=0}^{1} \ldots \sum_{j_n=0}^{1} y(j_1, j_2, \ldots, j_n)$$

Then we calculate the upper bound $D_{max}$ for mean distance to vertices, as explained in the previous section. This leads to $$\bar{y} - K_f D_{max} \leq f(\tilde{x}) \leq \bar{y} + K_f D_{max}$$

We conclude that lower and upper bound for values of the function f within this cell are:

$$M_{lo}(k_1, k_2, \ldots, k_n) = \bar{y} - K_f D_{max}$$
$$M_{up}(k_1, k_2, \ldots, k_n) = \bar{y} + K_f D_{max}$$

Figure 6:
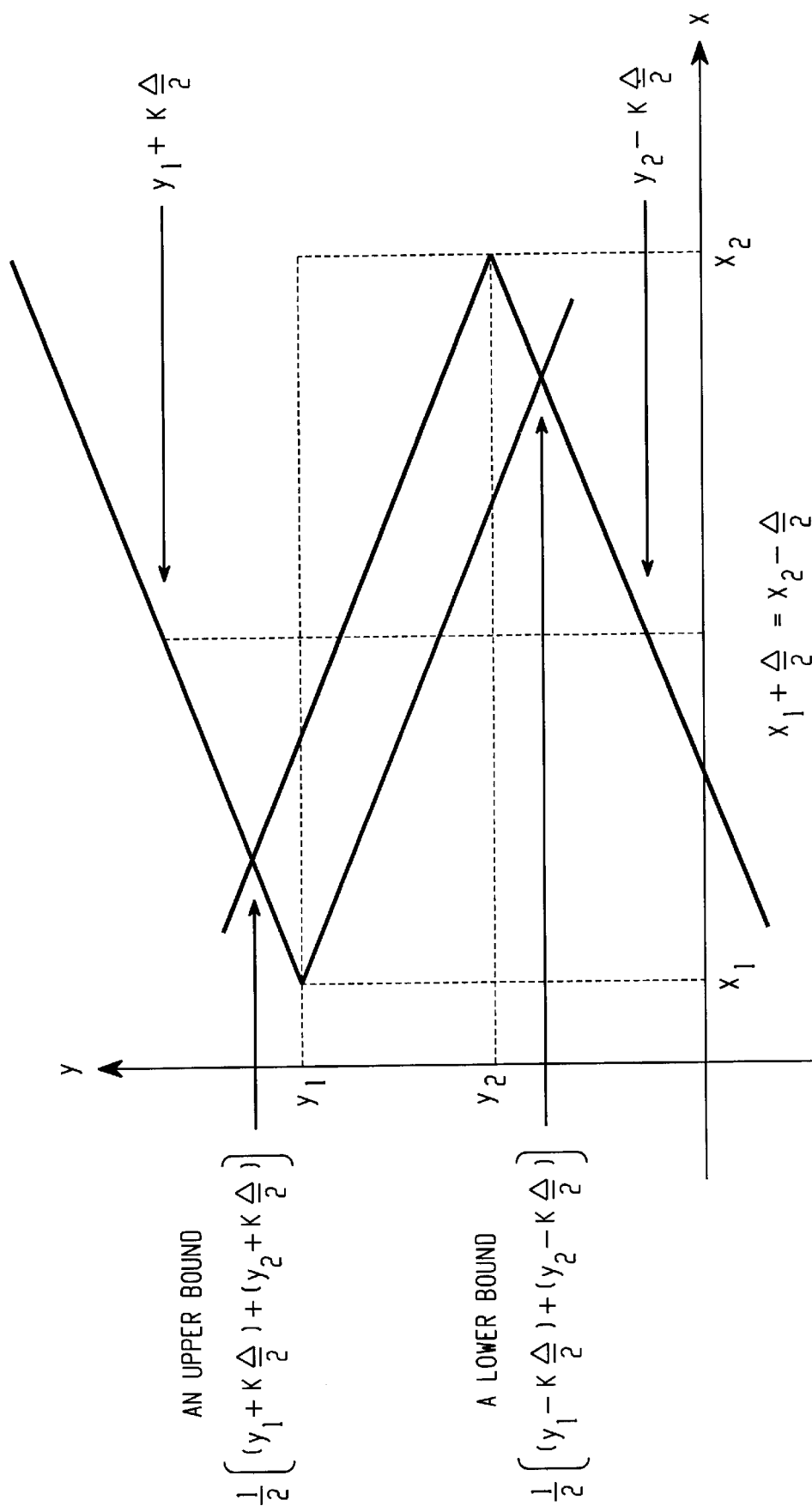
FIG. 6 is a graphical illustration of a bounding method for use in one embodiment of the present invention.

The essence of this bounding method is illustrated in FIG. 6, which shows one-dimensional case. Values of function f are shown at points $x_1$ and $x_2$ are $y_2$, and y2, respectively. Constant $K_f$ defines two cones of possible values of f starting at each of the (two) vertices $(x_1, y_1)$ and $(x_2, y_2)$. Note that each of the cones taken separately is quite conservative. Averaging n inequalities in the derivation above amounts to taking the intersection of the two admissible cones as shown in FIG. 6. The upper and lower bounds $M_{lo}$ and $M_{up}$ are the lowest and highest point of that intersection.

A.7 Bounds for Growth within a Rectangle—Second Order Approximation

The approximation derived in the previous section may be overly conservative. Much tighter bounds may be obtained if we take into account the derivatives of the mapping in question at the vertices. As before, let us choose a particular rectangular cell of the input domain, with the "lower-left" vertex $(k_1, k_2, \ldots, k_n)$, $0 \leq k_i < N_i - 1$. Let $x(j_1, j_2, \ldots, j_n)$ and $y(j_1, j_2, \ldots, j_n)$ denote the coordinates of the vertices and the corresponding values of the function. In addition we assume that gradient vectors $f'(x(j_1, \ldots, j_n))$ evaluated at vertices are available.

Let $\tilde{x}$ be an arbitrary point within the cell. Consider the straight line connecting $\tilde{x}$ to a vertex $X(j_1, j_2, \ldots, j_n)$. At that vertex, calculate be the directional derivative along that line towards $\tilde{x}$ $$g(\tilde{x}, j_1, \ldots, j_n) = f'(x(j_1, \ldots, j_n))(\tilde{x} - x(j_1, \ldots, j_n)) \frac{1}{D(\tilde{x}, j_1, \ldots, j_n)}$$

(Note that in the above formula, as elsewhere in this note, the gradient is treated as row vector). We use the constant $K'_f$ to bound growth of this derivative along this line, and obtain the following two inequalities $$f(\tilde{x}) \leq y(j_1, \ldots, j_n) + g(\tilde{x}, j_1, \ldots, j_n) D(\tilde{x}, j_1, \ldots, j_n) + 1/2 K'_f D(\tilde{x}, j_1, \ldots, j_n)^2$$

$$f(\tilde{x}) \leq y(j_1, \ldots, j_n) + g(\tilde{x}, j_1, \ldots, j_n) D(\tilde{x}, j_1, \ldots, j_n) - 1/2 K'_f D(\tilde{x}, j_1, \ldots, j_n)^2$$

We have $2^n$ such pairs of inequalities, one for each vertex. To use them jointly, we find minimal and maximal value of $g(\tilde{x}, j_1, \ldots, j_n)$ over all vertices.

$$g_{min}(\tilde{x}) = \min_{j_1, \ldots, j_n = 0,1} g(\tilde{x}, j_1, \ldots, j_n)$$

$$g_{max}(\tilde{x}) = \max_{j_1, \ldots, j_n = 0,1} g(\tilde{x}, j_1, \ldots, j_n)$$

Next, we use the maximal values of mean distance and mean square distance, $D_{max}$ and $D_{max}^{(2)}$, derived in a previous section, to obtain $$\bar{y} + g_{min}(\tilde{x}) D_{max} - 1/2 K'_f D_{max}^{(2)} \leq f(\tilde{x}) \leq \bar{y} + g_{max} + 1/2 K'_f D_{max}^{(2)}$$

where $\bar{y}$ is the mean value of the function over all vertices, as explained in the previous section.

To complete the procedure we bound the directional derivatives by values independent on $\tilde{x}$. We begin by transforming the gradient at each vertex as if the positive direction was towards the interior of the cell. To do so, for each vertex we calculate a new vector $h(j_1, \ldots, j_n)$, whose i-th coordinate is defined as $$h_i(j_1, \ldots, j_n) = (1 - 2j_i) f'_i(x(j_1, \ldots, j_n))$$

The purpose of multiplication by $(1-2j_i)$ is to retain the sign when $j_i=0$, that is when the original positive direction was into the cell, but change the sign when $j_i=1$, that is when the positive direction was pointing outside the cell. (Alternatively, we could use multiplication by $(-1)^{j_i}$.) We are interested in maximal and minimal value of directional derivative into the cell. Finding those bounds is equivalent to minimizing and maximizing a linear form $$h(j_1, \ldots, j_n)\xi = \sum_{i=1}^{n} h_i(j_1, \ldots, j_n)\xi_i$$

subject to constraints $$\|\xi\| = 1, \xi \geq 0$$

It may be shown (details are omitted here) that maximal and minimal values are given by $$M_{lo}(k_1, k_2, \ldots, k_n) = \bar{y} + G_{min} D_{max} - \frac{1}{2} K'_f D_{max}^{(2)}$$
$$M_{up}(k_1, k_2, \ldots, k_n) = \bar{y} + G_{max} D_{max} + \frac{1}{2} K'_f D_{max}^{(2)}$$

where vector $h^+$ is h with all negative components replaced by zero, and similarly $h^-$ is h with all positive components replaced by zero. More explicit formula are $$g_{max}(j_1, \ldots, j_n) =$$
$$\min\left(0, \max_i h_i(j_1, \ldots, j_n)\right) + \sqrt{\sum_{i=1}^{n} \max(0, h_i(j_1, \ldots, j_n))^2}$$

$$g_{min}(j_1, \ldots, j_n) =$$
$$\max\left(0, \min_i h_i(j_1, \ldots, j_n)\right) - \sqrt{\sum_{i=1}^{n} \min(0, h_i(j_1, \ldots, j_n))^2}$$

Now we take a minimum and maximum of these numbers over all vertices of the cell $$G_{max} = \max_{\substack{j_1=0.1 \\ \vdots \\ j_n=0.1}} g_{max}(j_1, \ldots, j_n)$$

$$G_{min} = \min_{\substack{j_1=0.1 \\ \vdots \\ j_n=0.1}} g_{min}(j_1, \ldots, j_n)$$

These values bound directional derivative from any vertex of the cell towards any point within the cell, therefore $$g_{max}(\tilde{x}) \leq G_{max} \quad g_{min}(\tilde{x}) \leq G_{min}$$

Now we are able to rewrite the previous inequalities, so that they are independent from the particular $\tilde{x}$ $$\bar{y} + G_{min}D_{max} - 1/2K'_f D_{max}^{(2)} \leq f(\tilde{x}) \leq \bar{y} + G_{max}D_{max} + 1/2K'_f D_{max}^{(2)}$$

We conclude that lower and upper bound for values of the function f within this cell are:

$$M_{lo}(k_1, k_2, \ldots, k_n) = \bar{y} + G_{min}D_{max} - \frac{1}{2}K'_j D_{max}^{(2)}$$

$$M_{up}(k_1, k_2, \ldots, k_n) = \bar{y} + G_{min}D_{max} + \frac{1}{2}K'_j D_{max}^{(2)}$$

A.8 Error Bounds for Neural Net Acting on Transformed and Noisy Inputs

In this section we demonstrate how to express error estimates for a case of neural net mapping defined on non-rectangular (transformed) domain of noisy measurements. We assume that the underlying state domain is still a rectangle $R=(x^{(lo)}, x^{(up)})$, and we have a single-valued look-up table function $\phi$ defined on this rectangle. The state values from the rectangle are transformed via mapping $\psi$ into m-dimensional measurement space. Mapping $\psi$ is specified by an m-valued look-up table, as discussed in section 4.2. In addition, we have neural net $f$ mapping operating on measurements $\psi(x)$ contaminated by additive noise.

$$y = f(\psi(x) + \zeta)$$

As explained hereinabove, we assume that noise vector is bounded, and specific numerical bounds are available.

$$\zeta_i^{(lo)} \leq \zeta_i \leq \zeta_i^{(up)}$$

Note that we will not perform a stochastic noise analysis. We analyze the worst case scenario, when the measurement errors have the biggest impact on neural net output. Our goal is to bound possible error between the neural net output and the desired ("true") value, as specified by the look-up table $\phi$. That is, we want to find bounds for the error function $$e(x) = f(\psi(x) + \zeta) - \phi(x)$$

We rewrite this expression by adding and subtracting the quantity $f(\psi(x))$ $$e(x) = (f(\psi(x) + \zeta) - f(\psi(x))) + (f(\psi(x)) - \phi(x))$$

To this we apply the triangle inequality to obtain $$|e(x)| \leq |f(\psi(x) + \zeta) - f(\psi(x))| + |f(\psi(x)) - \phi(x)|$$

Now, we can decompose our problem into two parts. The first term may be approximated using the Lipschitz constant for the neural net $$|f(\psi(x) + \zeta) - f(\psi(x))| \leq K_f \|\zeta\|$$

The second term is error between $\phi$ and the composite mapping $F(x) = f(\psi(x))$. Bounding constants $K_F$ and $K'_F$ for $F(x)$ are derived in appendix A.4, and procedures described in appendices A.6 or A.7 may be used to find bounds for the error function $e(x) = F(x) - \phi(x)$. Again, note that this derivation is based on the assumption that noise magnitude $\|\zeta\|$ is bounded.

While the present invention has been described hereabove based on one or more embodiments, it is understood that the invention should not be limited to any such embodiments, but rather construed in breadth and broad scope in accordance with the recitation of the appended claims hereto.

What is claimed:

1. A method of verifying the behavior of pretrained, static, feedforward neural network mapping software having a neural net mapping function $f(x)$ that is intended to replace look up table mapping software having a look up table mapping function $\phi(x)$, said method comprising executing the following steps on the neural network mapping software and look up table mapping software in a digital computer:
   establishing a multi-axis rectangular domain including upper and lower limits of each axis to bound all input vectors x of both said look up table mapping function $\phi(X)$ and said neural net mapping function $f(x)$;
   determining a set of test points within the rectangular domain based on said upper and lower limits of each axis;
   determining Lipschitz constant $K_f$ for said neural net mapping function $f(x)$;
   determining upper and lower value bounds of said neural net mapping function $f(x)$ for said domain based on a function of said set of test points and said Lipschitz constant $K_f$; and
   verifying the behavior of the neural network mapping software based on the determination of said upper and lower value bounds.

2. The method of claim 1 including the step of dividing the multi-axis domain into a plurality of cells based on the set of test points.

3. The method of claim 2 wherein the step of determining the upper and lower value bounds includes the steps of: determining upper and lower value bounds for each cell of the plurality based on a function of the test points of the corresponding cell and the Lipschitz constant $K_f$; selecting an upper value bound from the upper value bounds of the cells as the upper value bound of the neural net mapping function; and selecting a lower value bound from the lower value bounds of the cells as the lower value bound of the neural net mapping function.

4. The method of claim 3 wherein the maximum of the upper value bounds of the cells is selected as the upper value bound of the neural net mapping function; and the minimum of the lower value bounds is selected as the lower value bound of the neural net mapping function.

5. The method of claim 2 wherein the step of determining a set of test points includes the step of discretizing each axis i of the multi-axis domain into $N_i$ test point coordinates and $N_i - 1$ equal intervals of length $\Delta_i$; and wherein the step of dividing the domain into a plurality of cells includes forming the cells with the test point coordinates of the axes as its vertices, whereby each cell has $2^n$ test point vertices, where n is the number of axes in the domain.

6. The method of claim 5 wherein the step of determining upper and lower value bounds of the neural net mapping function $f(x)$ includes the steps of:
(a) determining values $y_j$ of a neural net mapping $f$ of each of the $2^n$ vertices j of a cell of the plurality;
(b) determining a mean y of said values $y_j$ of the cell;
(c) determining a mean distance d of any x within the cell from its vertices;
(d) determining a maximum $D_{max}$ of the mean distances determined for the cell; and
(e) determining an upper value bound of the cell by the expression: $y+K_f D_{max}$;
(f) determining a lower value bound of the cell by the expression: $y-K_f D_{max}$;
(g) repeating steps (a) through (f) to determine upper and lower value bounds for each cell of the plurality;
(h) selecting the maximum of the upper value bounds of the cells as the upper value bound of the neural net mapping function for the domain; and
(i) selecting the minimum of the lower value bounds of the cells as the lower value bound of the neural net mapping function for the domain.

7. The method of claim 1 including the steps of:
determining Lipschitz constant $K_f'$ for the gradient $f(x)'$; and
determining upper and lower error bounds for the neural net and look up table functions based on a function of the set of test points and said Lipschitz constant $K_f'$, whereby if the upper and lower value bounds and said upper and lower error bounds can be determined, then the neural network mapping software is verified.

8. The method of claim 7 including the step of dividing the multi-axis domain into a plurality of cells based on the set of test points.

9. The method of claim 8 wherein the step of determining upper and lower error bounds for said neural net and look up table functions includes the steps of: determining upper and lower error bounds for each cell of the plurality based on a function of the test points of the corresponding cell, the Lipschitz constant $K_f'$, and a desired constant $K_\phi'$; selecting an upper error bound from the upper error bounds of the cells as the upper error bound of the neural net and look up table mapping functions; and selecting a lower error bound from the lower error bounds of the cells as the lower error bound of the neural net and look up table mapping functions.

10. The method of claim 9 wherein the maximum of the upper error bounds of the cells is selected as the upper error bound of the neural net and look up table mapping functions; and the minimum of the lower error bounds is selected as the lower error bound of the neural net and look up table mapping functions.

11. The method of claim 8 wherein the step of determining a set of test points includes the step of discretizing each axis i of the multi-axis domain into $N_i$ test point coordinates and $N_i-1$ equal intervals of length $\Delta_i$; and wherein the step of dividing the domain into a plurality of cells includes forming the cells with the test point coordinates of the axes as its vertices, whereby each cell has $2^n$ test point vertices, where n is the number of axes in the domain; and wherein the step of determining upper and lower error bounds for said neural net and look up table functions includes the steps of:

(a) determining values $y_j$ of a neural net mapping $f$ of each of the $2^n$ vertices j of a cell of the plurality;
(b) determining values $v_j$ of a look up table mapping $\phi$ of each of the $2^n$ vertices j of the cell of the plurality;
(c) determining an error mapping value $e_j$ between each of said $y_j$ and $v_j$ values;
(d) determining a gradient vector $y_j'$ of the neural net mapping $y_j$;
(e) determining a maximum mean distance $D_{max}$ and a maximum mean square distance $D_{max}^2$ from mean distances $d_j$ between an input vector x within the cell and the vertices j of the corresponding cell;
(f) determining a mean error value e of the error values $e_j$ of the cell;
(g) determining a gradient $e_j'$ of said error mapping $e_j$ of the cell;
(h) determining a desired constant $K_\phi'$ valid within the cell;
(i) determining maximal and minimal values of directional derivatives at the vertices j of the cell as a function of $e_j'$; and determining bounds $G_{max}$ and $G_{min}$ of said maximal and minimal values;
(k) determining upper and lower error bounds for the cell as a function of e, $G_{max}$, $G_{min}$, $K_f'$, $K_\phi'$, $D_{max}$, and $D_{max}^2$;
(l) repeating steps (a) through (k) for each cell of said plurality; and
(m) selecting an upper error bound from the upper error bounds of the cells as the upper error bound of the neural net and look up table mapping functions and selecting a lower error bound from the lower error bounds of the cells as the lower error bound of the neural net and look up table mapping functions.

12. The method of claim 11 wherein the maximum of the upper error bounds of the cells is selected as the upper error bound of the neural net and look up table mapping functions; and the minimum of the lower error bounds is selected as the lower error bound of the neural net and look up table mapping functions.

13. The method of claim 1 wherein the look up table mapping software being replaced includes entries for mapping inputs of fuel plane coefficients x of a fuel tank to fuel quantity of the fuel tank $\phi(x)$; and wherein the neural network mapping software replacement yields an estimate of said fuel quantity $f(x)$.

14. The method of claim 13 including the step of operating the neural network mapping software in a digital processor for estimating fuel quantity of at least one fuel tank.

15. A method of verifying the behavior of pretrained, static, feedforward neural network mapping software having a neural network mapping function $f(\psi(x)+\zeta)$, where $\psi(x)$ is a predetermined mapping of n dimensional state vectors x of a process into m dimensional measurement vectors $z=\psi(x)$, $\zeta$ is representative of a noise component of the process, and $f(\psi(x)+\zeta)$ is an estimate of the desired output parameter y(est) of the process, said method comprising the steps of:
providing model mapping software including a predetermined mapping function $\phi(x)$ for mapping said n dimensional state vectors x directly into a true value y(true) of said desired output parameter;
executing the following steps on the neural network mapping software and model mapping software in a digital computer:
establishing a multi-axis rectangular domain including upper and lower limits of each axis to bound all state vectors x of both said predetermined mapping functions $\phi(x)$ and $\psi(x)$;
determining a set of test points within the rectangular domain based on said upper and lower limits of each axis;

determining Lipschitz constant $K_f$ for neural net mapping function $f(\psi(x))$;

determining an upper bound $\zeta^{up}$ and a lower bound $\zeta^{lo}$ of the noise component $\zeta$;

determining upper and lower value bounds of said neural net mapping function $f(\psi(x)+\zeta)$ for said domain based on a function of said set of test points, said Lipschitz constant $K_f$ and said upper bound $\zeta^{up}$ and lower bound $\zeta^{lo}$ and verifying the behavior of the neural network mapping software based on the determination of said upper and lower value bounds.

16. The method of claim 15 wherein the predetermined mapping function $\phi(x)$ is provided as a look up table mapping function.

17. The method of claim 15 including the step of dividing the multi-axis domain into a plurality of cells based on the set of test points.

18. The method of claim 17 wherein the step of determining the upper and lower value bounds includes the steps of: determining upper and lower value bounds for each cell of the plurality based on a function of the test points of the corresponding cell and the Lipschitz constant $K_f$; selecting an upper value bound from the upper value bounds of the cells as the upper value bound of the neural net mapping function; and selecting a lower value bound from the lower value bounds of the cells as the lower value bound of the neural net mapping function.

19. The method of claim 18 wherein the maximum of the upper value bounds of the cells is selected as the upper value bound of the neural net mapping function; and the minimum of the lower value bounds is selected as the lower value bound of the neural net mapping function.

20. The method of claim 17 wherein the step of determining a set of test points includes the step of discretizing each axis i of the multi-axis domain into $N_i$ test point coordinates and $N_i-1$ equal intervals of length $\Delta_i$; and wherein the step of dividing the domain into a plurality of cells includes forming the cells with the test point coordinates of the axes as its vertices, whereby each cell has $2^n$ test point vertices, where n is the number of axes in the domain.

21. The method of claim 20 wherein the step of determining upper and lower value bounds of the neural net mapping function $f(\psi(x)+\zeta)$ includes the steps of:

(a) determining values $y_j$ of a predetermined mapping $f(\psi(x_j))$ of each $x_j$ of the $2^n$ vertices j of a cell of the plurality;

(b) determining a Lipschitz constant $K_\psi$ for the cell based on said values $y_j$ of the cell;

(c) determining a mean y of said values $y_j$ of the cell;

(d) determining a maximum mean distance $D_{max}$ for the cell from distances of any x within the cell from its vertices;

(e) determining a maximum value $\zeta_{max}$ of the noise component $\zeta$ from its upper and lower bounds;

(f) determining an upper value bound of the cell by the expression:

$y+K_F D_{max}+K_f \zeta_{max}$, where $K_F=K_f K_\psi$;

(g) determining a lower value bound of the cell by the expression:

$y-K_F D_{max}-K_f \zeta_{max}$, where $K_F=K_f K_\psi$;

(h) repeating steps (a) through (g) to determine upper and lower value bounds for each cell of the plurality;

(i) selecting the maximum of the upper value bounds of the cells as the upper value bound of the neural net mapping function for the domain; and (k) selecting the minimum of the lower value bounds of the cells as the lower value bound of the neural net mapping function for the domain.

22. The method of claim 15 including the steps of:

determining Lipschitz constant $K_f'$ for the gradient $f(\psi(x))'$;

determining upper and lower error bounds for said neural net function $f(\psi(x)+\zeta)$ and predetermined mapping function $\phi(x)$ based on a function of said set of test points, said Lipschitz constant $K_f'$, and said upper bound $\zeta^{up}$ and a lower bound $\zeta^{lo}$, whereby if the upper and lower value bounds and said upper and lower error bounds can be determined, then the neural network mapping software is verified.

23. The method of claim 22 including the step of dividing the multi-axis domain into a plurality of cells based on the set of test points.

24. The method of claim 23 including decomposing the error between neural net mapping function $f(\psi(x)+\zeta)$ and the predetermined mapping function $\phi(x)$ into a noise free error component $F(x)-\phi(x)$ and a term representative of noise magnitude.

25. The method of claim 23 wherein the step of determining the upper and lower error bounds includes the steps of: determining upper and lower error bounds for each cell of the plurality based on a function of the test points of the corresponding cell, the Lipschitz constants $K_f$ and $K_f'$ and Lipschitz constants $K_\psi$ and $K_\psi'$; selecting an upper error bound from the upper error bounds of the cells as the upper error bound of the neural net mapping function and predetermined mapping $\phi(x)$; and selecting a lower error bound from the lower error bounds of the cells as the lower error bound of the neural net mapping function and predetermined mapping $\phi(x)$.

26. The method of claim 25 wherein the maximum of the upper error bounds of the cells is selected as the upper error bound of the neural net mapping function and predetermined mapping $\phi(x)$; and the minimum of the lower error bounds is selected as the lower error bound of the neural net mapping function and predetermined mapping $\phi(x)$.

27. The method of claim 23 wherein the step of determining a set of test points includes the step of discretizing each axis i of the multi-axis domain into $N_i$ test point coordinates and $N_i-1$ equal intervals of length $\Delta_i$; and wherein the step of dividing the domain into a plurality of cells includes forming the cells with the test point coordinates of the axes as its vertices, whereby each cell has $2^n$ test point vertices, where n is the number of axes in the domain; and wherein the step of determining upper and lower error bounds for the neural net mapping function and predetermined mapping $\phi(x)$ includes the steps of:

(a) determining values $y_j$ of a neural net function mapping $f(\psi(x_j))$ of each $x_j$ of the $2^n$ vertices j of a cell of the plurality;

(b) determining values $v_j$ of a predetermined mapping $\phi(x_j)$ of each $x_j$ of the $2^n$ vertices j of the cell of the plurality;

(c) determining an error mapping value $e_j$ between each of said $y_j$ and $v_j$ values;

(d) determining a gradient vector $y_j'$ of the neural net mapping $y_j$;

(e) determining a maximum mean distance $D_{max}$ and a maximum mean square distance $D_{max}^2$ from mean distances $d_j$ between an input vector x within the cell and the vertices j of the corresponding cell;

(f) determining a mean error value e of the error values $e_j$ of the cell;

(g) determining a gradient $e_j'$ of said error mapping $e_j$ of the cell;

(h) determining Lipschitz constants $K_\phi'$, $K_\psi$, and $K_\psi'$ valid within the cell;

(i) determining maximal and minimal values of directional derivatives at the vertices j of the cell as a function of $e_j'$; and determining bounds $G_{max}$ and $G_{min}$ of said maximal and minimal values;

(k) determining upper and lower error bounds for the cell as a function of e, $G_{max}$, $G_{min}$, $K_f$, $K_f'$, $K_\phi'$, $D_{max}$, $D_{max}^2$, $K_\psi$, and $K_\psi'$;

(l) repeating steps (a) through (k) for each cell of said plurality;

(m) selecting an upper error bound from the upper error bounds of the cells and selecting a lower error bound from the lower error bounds of the cells;

(n) determining a value $\zeta_{max}$ of the noise component $\zeta$ from its upper and lower bounds; and (o) determining the lower error bound of the neural net mapping function and predetermined mapping $\phi(x)$ by subtracting a product $K_f \zeta_{max}$ from the selected lower error bound and determining the upper error bound of the neural net mapping function and predetermined mapping $\phi(x)$ by adding the product $K_f \zeta_{max}$ to the selected upper error bound.

28. The method of claim 27 wherein the maximum of the upper error bounds of the cells is selected as the upper error bound of the neural net mapping function and predetermined mapping $\phi(x)$; and the minimum of the lower error bounds is selected as the lower error bound of the neural net mapping function and predetermined mapping $\phi(x)$.

29. The method of claim 15 wherein the predetermined mapping function $\psi(x)$ is provided as a look up table mapping function coded in software.

30. The method of claim 15 wherein the predetermined mapping function $\psi(x)$ is provided as a computer simulation model of the process coded in software.

31. The method of claim 15 wherein the state vector x is provided as states of a fuel tank; wherein the measurement vector z is provided as an estimation of measurements of the states of the fuel tank; wherein $\zeta$ is provided as a noise component in the measurement of the state of the fuel tank; and including the step of operating the neural network mapping software in a digital processor for estimating fuel quantity of at least one fuel tank.

* * * * *